United States Patent [19]
Yoshioka

[11] Patent Number: 6,085,211
[45] Date of Patent: Jul. 4, 2000

[54] LOGIC CIRCUIT AND FLOATING-POINT ARITHMETIC UNIT

[75] Inventor: Shinichi Yoshioka, Tokyo, Japan

[73] Assignee: Kabushiki Kaisha Toshiba, Kawasaki, Japan

[21] Appl. No.: 09/022,845

[22] Filed: Feb. 12, 1998

[30] Foreign Application Priority Data

Feb. 13, 1997 [JP] Japan ................................ 9-029326
Jan. 14, 1998 [JP] Japan ................................ 10-006026

[51] Int. Cl.[7] ........................ G06F 7/42; G06F 7/00
[52] U.S. Cl. ........................................ 708/505; 708/205
[58] Field of Search ................................ 708/205, 501, 708/505

[56] References Cited

U.S. PATENT DOCUMENTS

| | | | |
|---|---|---|---|
| 4,926,369 | 5/1990 | Hokenek et al. | 708/205 |
| 5,343,413 | 8/1994 | Inoue | 708/205 |
| 5,530,663 | 6/1996 | Garcia et al. | 708/501 |
| 5,764,549 | 6/1998 | Bjorksten et al. | 708/205 |
| 5,771,183 | 6/1998 | Makineni | 708/205 |
| 5,798,952 | 8/1998 | Miller, Jr. et al. | 708/505 |
| 5,831,884 | 11/1998 | Suzuki | 708/505 |

OTHER PUBLICATIONS

Hokenek et al., "Leading–Zero anticipator (LZA) in the IBM RISC System/6000 floating–point execution unit" *IBM J. Res. Develop.* 34:71–77 (1990).

Suzuki et al. "Leading–Zero Anticipatory Logic for High-–speed Floating Point Addition" *IEEE* pp. 589–592 (1995).

*Primary Examiner*—Tan V. Mai
*Attorney, Agent, or Firm*—Foley & Lardner

[57] ABSTRACT

With the use of outputs of priority encoders serving as selection signals, final carry signals at respective bits in an adder can be selected as signals indicating whether or not prediction error is present. Accordingly, it is possible to detect earlier whether or not prediction error in a cancelling bit prediction circuit is present.

11 Claims, 25 Drawing Sheets

| INPUT | OUTPUT |
|-------|--------|
| S     | DB     |
| 1     | DA1    |
| 0     | DA0    |

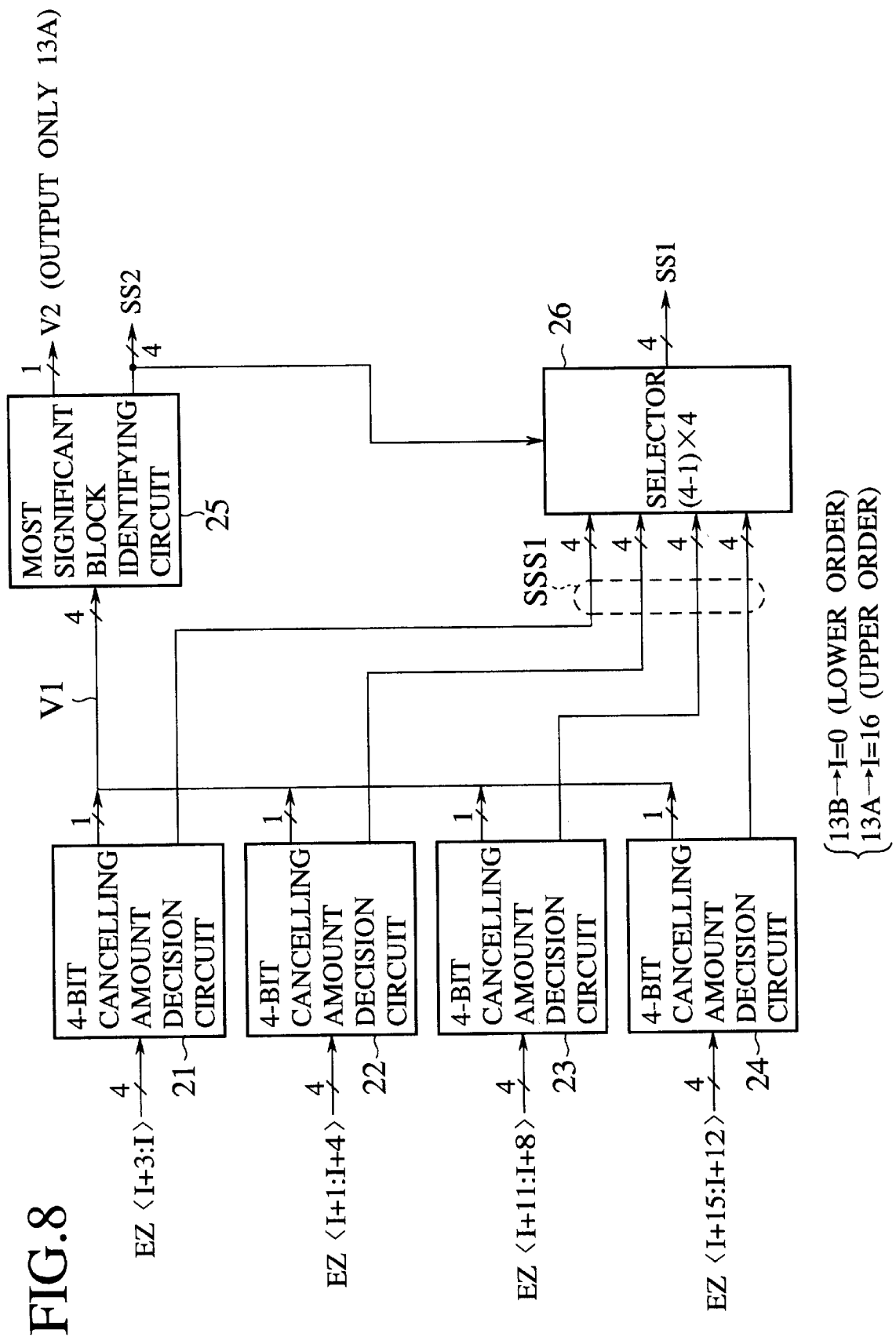

| INPUT | | | | OUTPUT |
|---|---|---|---|---|
| S3 | S2 | S1 | S0 | DB |
| 1 | 0 | 0 | 0 | DA3 |
| 0 | 1 | 0 | 0 | DA2 |
| 0 | 0 | 1 | 0 | DA1 |
| 0 | 0 | 0 | 1 | DA0 |
| 0 | 0 | 0 | 0 | HIGH IMPEDANCE |

| INPUT | | | | OUTPUT | | | | |
|---|---|---|---|---|---|---|---|---|
| DA3 | DA2 | DA1 | DA0 | DB3 | DB2 | DB1 | DB0 | E |
| 1 | - | - | - | 1 | 0 | 0 | 0 | 1 |
| 0 | 1 | - | - | 0 | 1 | 0 | 0 | 1 |
| 0 | 0 | 1 | - | 0 | 0 | 1 | 0 | 1 |
| 0 | 0 | 0 | 1 | 0 | 0 | 0 | 1 | 1 |
| 0 | 0 | 0 | 0 | 0 | 0 | 0 | 1 | 0 |

FIG.12A (16/0 BIT SHIFTER)

| INPUT | OUTPUT |
|---|---|
| S3 | SHIFT AMOUNT |
| 1 | 0 |
| 0 | 16 |

FIG.12B (12/8/4/0 BIT SHIFTER)

| INPUT | | | | OUTPUT |
|---|---|---|---|---|
| S2⟨3⟩ | S2⟨2⟩ | S2⟨1⟩ | S2⟨0⟩ | SHIFT AMOUNT |
| 1 | 0 | 0 | 0 | 0 |
| 0 | 1 | 0 | 0 | 4 |
| 0 | 0 | 1 | 0 | 8 |
| 0 | 0 | 0 | 1 | 12 |

FIG.12C (3/2/1/0 BIT SHIFTER)

| INPUT | | | | OUTPUT |
|---|---|---|---|---|
| S1⟨3⟩ | S1⟨2⟩ | S1⟨1⟩ | S1⟨0⟩ | SHIFT AMOUNT |
| 1 | 0 | 0 | 0 | 0 |
| 0 | 1 | 0 | 0 | 1 |
| 0 | 0 | 1 | 0 | 2 |
| 0 | 0 | 0 | 1 | 3 |

FIG.12D (1/0 BIT SHIFTER)

| INPUT | OUTPUT |
|---|---|
| SHIFTR | SHIFT AMOUNT |
| 1 | -1 |
| 0 | 0 |

(LEFT DIRECTION IS SET POSITIVE)

801: 4-BIT CLA

LOGIC CIRCUIT AND FLOATING-POINT ARITHMETIC UNIT

BACKGROUND OF THE INVENTION

1. Field of the Invention

The present invention relates to a logic circuit employed in a floating-point arithmetic unit, etc. so as to detect prediction error in a cancelling bit prediction circuit which is used in a mantissa normalization circuit, and a floating-point arithmetic unit having a function of detecting cancelling prediction error.

2. Description of the Related Art

In order to true up or justify leftward most significant bits of the mantissas onto a particular position or digit, normalization process is needed in the floating-point arithmetic unit after a calculating operation has been completed. This normalization process is such a process that the number of "0's" or "1's" which are aligned continuously from the most significant digits of the arithmetic result are counted and then the arithmetic result is shifted left by digits corresponding to the counted number of leading "0's" or leading "1's".

With the progress of the processor speed, such a method has been proposed that enables to predict the number of "0's" or "1's" which are aligned continuously from the most significant digits of the arithmetic result in parallel with the calculation process (cancelling prediction system or cancelling prediction circuit). According to this method, an amount of the left shift to be executed in the normalization process can be predicted based on the operand. Such cancelling prediction system has been set forth in papers published by E. HOKENEK (IBM, J. RES. DEVELP. VOL. 34, 1990, pp. 71–77), H. SUZUKI et al. (CICC proc., 1995, pp.27.5.1–27.5.4), etc.

FIG. 1 is a state transition diagram explaining a basic principle of the above cancelling prediction (leading zero/one anticipation).

First, two numbers A, Bx are compared with each other bit by bit and then, according to respective compared states, a signal G (both are "1's"), a signal Z (both are "0's"), and a signal P (they are "1" and "0") which represent following three states respectively are defined. Where "and" denotes a logical product; "or", a logical sum; "xor", exclusive logical sum; and "not", negative logic.

g<i>=A<i> and Bx<i>, p<i>=A<i> xor Bx<i>, and z<i>=not (A<i> or Bx<i>).

Any of three these signals becomes "1" from the most significant bit. Therefore, if the states are checked based on the signal from the most significant bit to the least significant bit in compliance with the state transition diagram having three states shown in FIG. 1, the bit at which cancelling occurs can be specified.

According to the paper published by H. SUZUKI et al., only the prediction signals (cancelling prediction signals) which are so predicted that cancelling can be generated from the Z-state shown in FIG. 1 can be extracted, and then the most significant bit signals can be detected from such prediction signals by priority encoders. With the use of the fact that high/low relationship between two numbers has already been known, a logic for generating the cancelling prediction signals can be simply implemented by this cancelling prediction circuit. In other words, in the case of subtraction, since order of two numbers is switched according to the high/low relationship between two numbers so as to assure that the remainder becomes surely positive, there exist no transition to the G-state.

FIG. 2 is a block diagram showing a configuration of a floating-point arithmetic unit in the prior art. FIG. 3 is a conceptional view showing the lapse of time in an operation of the floating-point arithmetic unit shown in FIG. 2.

The floating-point arithmetic unit comprises a high/low comparator 1100 for comparing high/low of two operands A<31:0> and B<31:0>; a pair of selectors 1103 and a pair of inverters 1104 for inverting either of two operands A<31:0> and B<31:0> based on the result of the high/low comparison in the case of subtraction; an arithmetic unit (adder) 1101 for receiving respective outputs of the pair of selectors 1103; and a Leading zero/one anticipator (cancelling prediction circuit) 1102 for executing the above cancelling prediction.

Although an explanation is made herein under the assumption that the operand B<31:0> is smaller than the operand A<31:0>, generality is not lost. Inverted bit data of the operand B<31:0> is expressed as Bx<31:0>. A cancelling prediction operation executed by the cancelling prediction circuit 1102 (period T1 in FIG. 3) can be carried out in parallel with an add-subtract operation executed by the arithmetic unit 1101 (period T2 in FIG. 3).

A left shifter 1105 is connected to the output side of the arithmetic unit 1101. With the use of a shift amount control signal S100 which is the result of the Leading zero/one Anticipator (cancelling prediction circuit) 1102 for executing the above cancelling prediction, the left shifter 1105 can execute a left shift operation (period T3 in FIG. 3) in order to execute the above normalization process. In addition, a rounding processor 1106 can execute rounding process to round up the arithmetic result of the arithmetic unit 1101 within the designated number of digit. Then, a selector 1107 can select one of the result of the rounding processor 1106 and the result of the left shifter 1105.

The left shifter 1105 used to execute the above normalization process can execute the left shift process by use of the result of the above Leading zero/one Anticipator (cancelling prediction circuit) 1102. However, since one bit prediction error is included in the shift amount control signal S100 which is the result of the Leading zero/one Anticipator (cancelling prediction circuit) 1102, one bit error correction shift (right shift) is executed by a right shifter 1108 in the wake of the left shift operation to carry out the normalization process.

One bit prediction error can be detected (period T4 in FIG. 3) by examining the most significant bit (MSB) of the output of the left shifter 1105 (i.e., normalized arithmetic result). According to this result, the right shifter 1108 can determine whether or not one bit error correction shift must be executed (period T5 in FIG. 3). At this time, the most significant bit of the result of the left shifter 1105 can be supplied to the right shifter 1108 via a buffer 1109.

However, in the floating-point arithmetic unit in the prior art, following problems have arisen.

As described above, one bit error correction shift must be effected after the normalization process (left shift operation) since one bit prediction error is included in the result of the cancelling prediction circuit 1102. At this time, it has been decided by examining the most significant bit of the arithmetic result whether or not one bit error correction shift must be executed.

In the event that the one bit error correction shift is needed or not by checking the most significant bit of the normalized arithmetic result, there has been a possibility that, if a delay time in the buffer 1109 to drive the right shifter 1108 is taken into consideration, this one bit prediction error detection becomes a critical path.

In addition, in the event that the cancelling prediction bit signal is prepared with the use of the fact that the high/low relationship between two numbers has already been known, such high/low relationship between two numbers must be decided before execution of the calculation. As a result, a delay time in the high/low comparator has been added to this computing time.

SUMMARY OF THE INVENTION

Therefore, the present invention has been made in light of such circumstances and it is an object of the present invention to provide a logic circuit capable of improving a detection timing for a cancelling prediction error.

In addition, it is another object of the present invention to provide a floating-point arithmetic unit capable of increasing higher its overall operation speed by improving the detection timing for the cancelling prediction error caused in normalization process.

In order to achieve the above objects of the present invention, there is provided a logic circuit comprising a cancelling bit prediction circuit for comparing bit by bit two operands which are input into an adder to be calculated, to decide previously bit by bit whether or not cancelling is caused by addition; priority encoders for outputting, in an encoded format, position of a most significant bit out of bits which have been decided previously by the cancelling bit prediction circuit such that cancelling is caused; and cancelling prediction error detectors for detecting prediction error in the cancelling bit prediction circuit based on outputs of the priority encoders; wherein the cancelling prediction error detectors are composed of selectors which can select final carry signals at respective bits in the adder as signals indicating presence of the prediction error, by use of outputs of the priority encoders as selection signals.

According to the embodiment of the present invention, the cancelling prediction error detectors receive intermediate results in the priority encoders as the selection signals.

There is provided a logic circuit comprising a cancelling bit prediction circuit for comparing bit by bit two operands which are input into an adder to be calculated, to decide previously bit by bit whether or not cancelling is caused by addition; priority encoders for outputting, in an encoded format, position of a most significant bit out of bits which have been decided previously by the cancelling bit prediction circuit such that cancelling is caused; and cancelling prediction error detectors for detecting prediction error in the cancelling bit prediction circuit based on outputs of the priority encoders; wherein the cancelling prediction error detectors can select carry generation signals and carry propagation signals as intermediate results of the adder by use of intermediate results in the priority encoders as selection signals, then generate carry signals which correspond to bits predicted by the cancelling bit prediction circuit based on the carry generation signals and the carry propagation signals which are finally selected, and then output the carry signals as signals indicating whether or not the prediction error is present.

There is provided a floating-point arithmetic unit comprising an adder for receiving two operands to execute an arithmetic operation; a cancelling bit prediction circuit for comparing two operands bit by bit to decide previously bit by bit whether or not cancelling is caused by addition; priority encoders for outputting, in an encoded format, position of a most significant bit out of bits which have been decided previously by the cancelling bit prediction circuit such that cancelling is caused; normalizing means for executing normalization process of an arithmetic output of the adder based on outputs of the priority encoders after floating-point arithmetic operation; error correcting means for executing error correction of result processed by the normalizing means; and cancelling prediction error detectors for detecting prediction error in the cancelling bit prediction circuit based on outputs of the priority encoders and final carry signals at respective bits of the adder; wherein the error correcting means can execute the error correction according to detection results of the cancelling prediction error detectors.

According to the embodiment of the present invention, the cancelling prediction error detectors are composed of selectors which can select carry signals at bits at which cancelling is caused from final carry signals at respective bits in the adder using outputs of the priority encoders as selection signals, and the error correcting means can execute the error correction according to the output of the selectors.

According to the embodiment of the present invention, the cancelling prediction error detectors can receive intermediate results in the priority encoders as the selection signals.

According to the embodiment of the present invention, the cancelling prediction error detectors can select carry generation signals and carry propagation signals as intermediate results of the adder by use of intermediate results in the priority encoders as the selection signals, and then generate carry signals which correspond to bits predicted by the cancelling bit prediction circuit based on the carry generation signals and the carry propagation signals which are finally selected, and the error correcting means can execute the error correction according to the carry signals.

There is provided a floating-point arithmetic unit comprising a cancelling bit prediction circuit for comparing bit by bit two operands which are input into an adder to be calculated, to decide previously bit by bit whether or not cancelling is caused by addition; priority encoders for receiving bit patterns which are output from the cancelling bit prediction circuit to indicate whether or not cancelling is present, and outputting position of a most significant bit out of bits which have been decided previously such that cancelling is caused, as selection signals in an encoded format; and cancelling prediction error detectors; wherein the cancelling prediction error detectors can select carry generation signals and carry propagation signals finally based on intermediate results of the adder or respective bit carry look-ahead signals of two operands to be calculated, using intermediate results in the priority encoders as the selection signals, and then generate carry signals which correspond to bits predicted by the cancelling bit prediction circuit based on the carry generation signals and the carry propagation signals.

According to the embodiment of the present invention, under assumptions that operands are two n-bit numbers A<n-1:0>, B<n-1:0>, sign bits are SA, SB, or Bx=not B, SA="0", SB="1" in case of subtraction and Bx=B, SA="0", SB="1", i<n in case of addition, and g<i>=A<i> and Bx<i>
p<i>=A<i> xor Bx<i>
z<i>=not (A<i> or Bx<i>)
g<n>=SA and SB
p<n+1>=p<n>=SA xor SB
z<n>=not (SA or SB), the cancelling bit prediction circuit can predict the cancelling bit prediction signal EZ<i> as EZ<i>=((not p<i+2>) and (((g<i+1> and (not g<i>)) or (z<i+1> and (not z<i>)))) or ((p<i+2>) and (((g<i+1> and (not z<i>)) or (z<i+1> and (not g<i>)))).

According to the embodiment of the present invention, a floating-point arithmetic unit further comprises a high/low comparator for comparing a high/low relationship between A and B, and wherein, under assumptions that g<i>=A<i> and Bx<i>, p<i>=A<i> xor Bx<i>, Bx=not B in case of subtraction, Bx=B in case addition, and the carry signal C<k> at a k-th bit is C<k>=g<k> or (p<k> and g<k-1>) or (p<k> and p<k-1> and g<k-2>) or (p<k> and p<k-1> and p<k-2> and g<k-3> or ... or (p<k> and p<k-1> and p<k-2> and ... and p<2> and p<1> and g<0>) or (p<k> and p<k-1> and p<k-2> and ... and p<2> and p<1> and p<0> and Cin), the prediction error detecting signal at a k-th bit is set to C<k> in case Cin=1 when the high/low comparator has decided that a result of subtraction A−B is positive, and the prediction error detecting signal at the k-th bit is set to (not C<k>) in case Cin=1 when the high/low comparator has decided that the result of subtraction A−B is negative.

According to the embodiment of the present invention, if the cancelling bit prediction circuit and the priority encoders can identify that cancelling is caused at the k-th bit and if arithmetic operation is addition, the prediction error detecting signal is set to C<k> in case of Cin=0.

BRIEF DESCRIPTION OF THE DRAWINGS

FIG. 8 is a block diagram showing a configuration of respective 16-bit cancelling amount decision circuits 13A, 13B shown in FIG. 6;

FIGS. 12A, 12B, 12C, 12D are tables showing relationships between shift amount selection control signals S3, S2, S1 and respective shift amounts in respective bit shifters 31, 32, 33, 5 shown in FIG. 11;

DETAILED DESCRIPTION OF THE EMBODIMENTS

Embodiments of the present invention will be explained in detail with reference to accompanying drawings hereinafter.

First Embodiment

Figure 1:
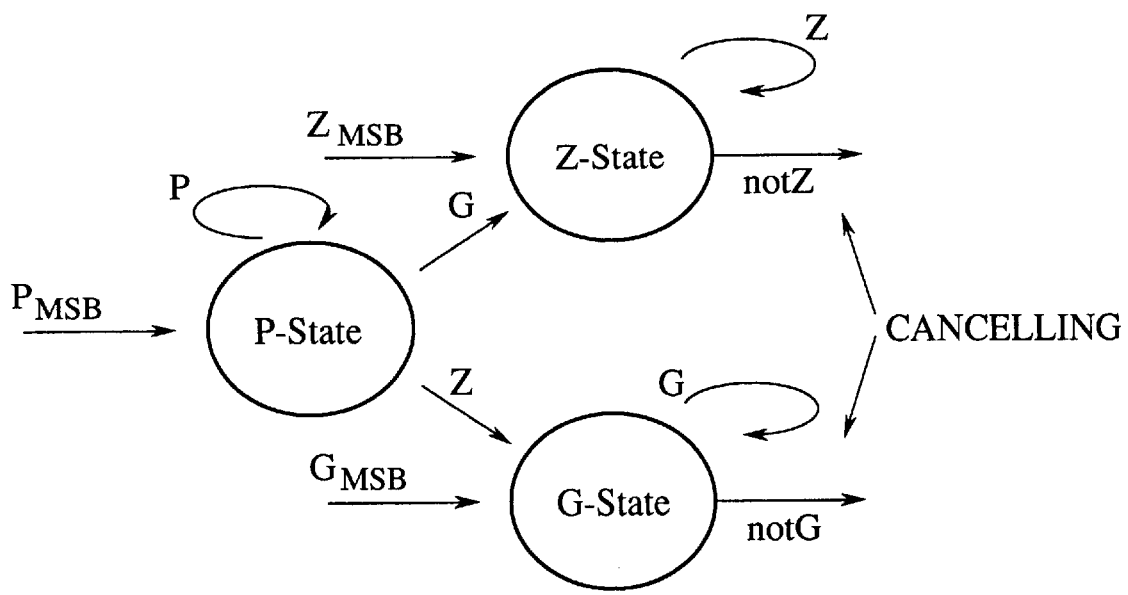
FIG. 1 is a state transition diagram explaining a basic principle of cancelling prediction.
Figure 2:
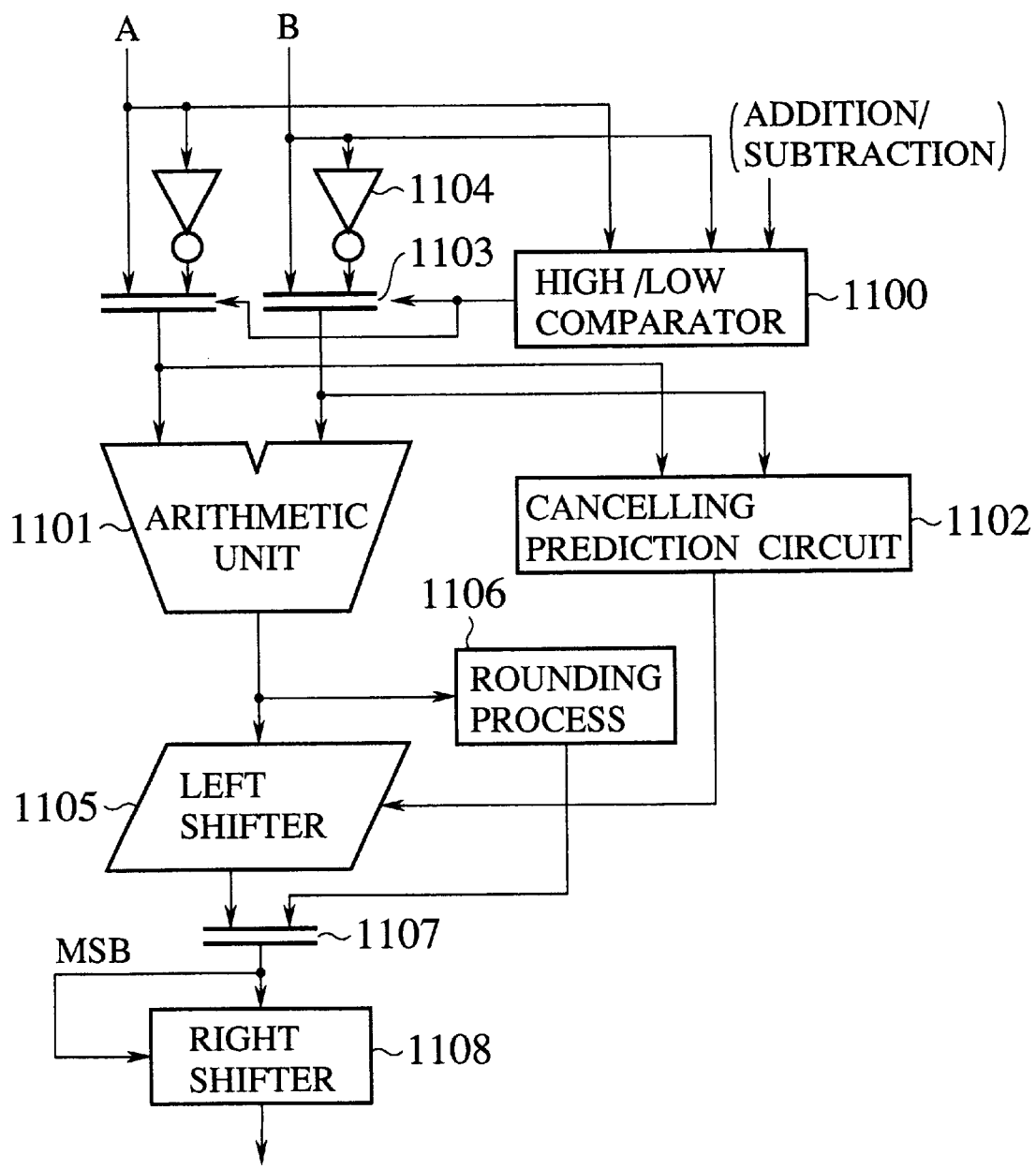
FIG. 2 is a block diagram showing a configuration of a floating-point arithmetic unit in the prior art.
Figure 3:
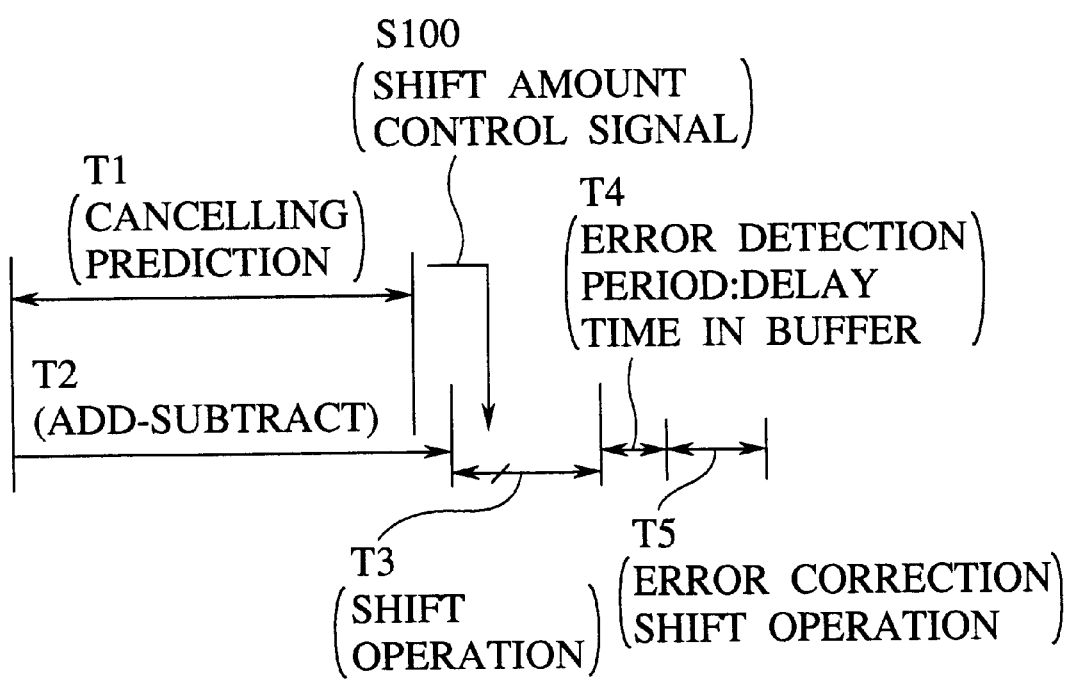
FIG. 3 is a conceptional view showing the lapse of time in an operation of the floating-point arithmetic unit shown in FIG. 2.
Figure 4:
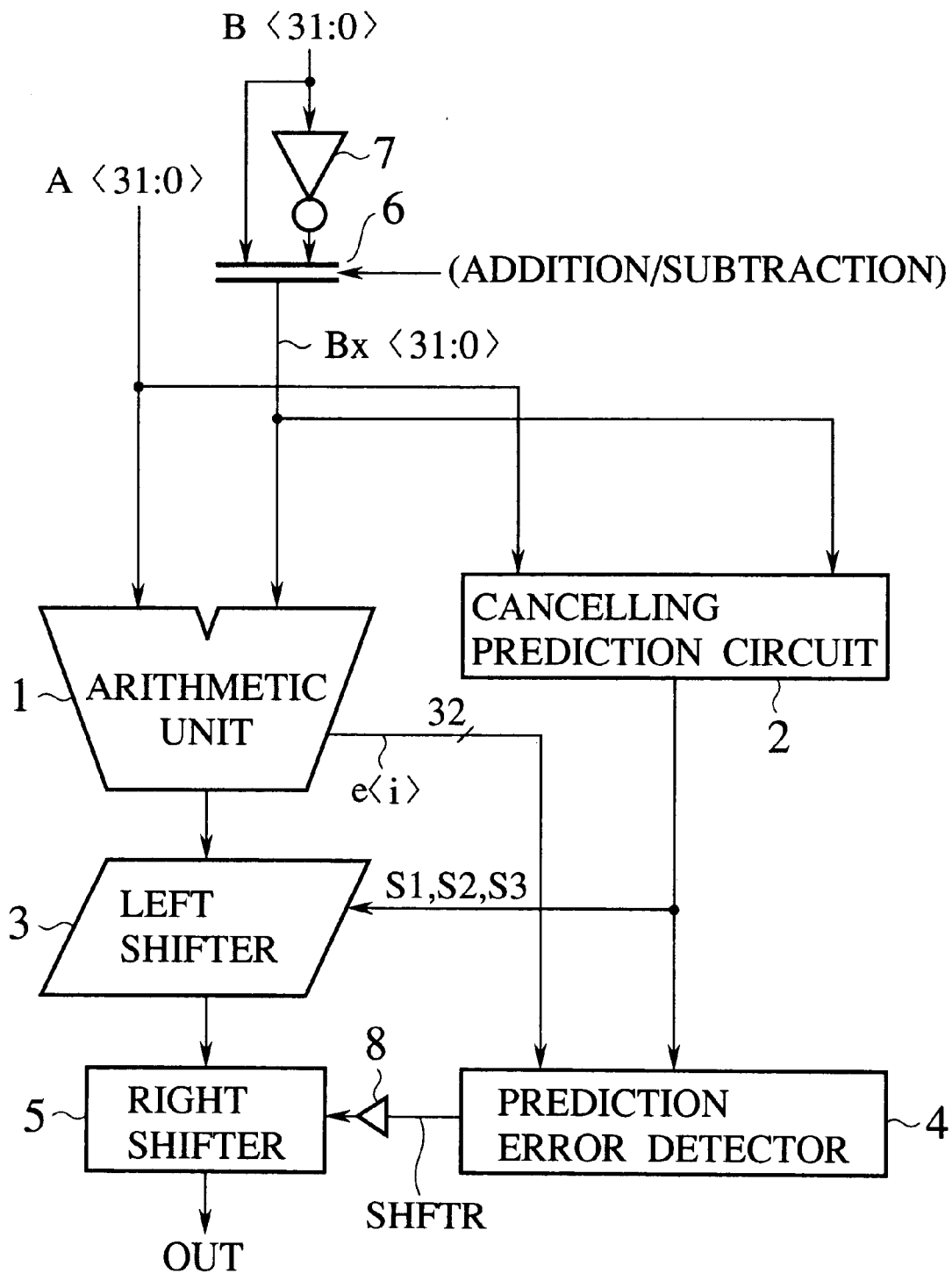
FIG. 4 is a block diagram showing a configuration of a floating-point arithmetic unit according to a first embodiment of the present invention.

FIG. 4 is a block diagram showing a configuration of a floating-point arithmetic unit according to a first embodiment of the present invention.

This floating-point arithmetic unit comprises an arithmetic unit (adder) 1, a Leading zero/one Anticipator (cancelling prediction circuit) 2, a left shifter 3, a prediction error detector 4, and a right shifter 5. Two operands A<31:0> and Bx<31:0> are input into the arithmetic unit 1 and the Leading zero/one Anticipator (cancelling prediction circuit) 2.

The adder 1 can effect addition/subtraction of the operands A<31:0> and Bx<31:0>. The Leading zero/one Anticipator (cancelling prediction circuit) 2 can effect the above cancelling prediction. The operand Bx is an output of a selector 6. In other words, the selector 6 can select one of the operand B<31:0> and its inverted data (data inverted by an inverter 7) in accordance with the addition/subtraction, and then output the selection result as the above operand Bx<31:0> to the adder 1. A cancelling prediction operation executed by the Leading zero/one Anticipator (cancelling prediction circuit) 2 can be executed in parallel with the addition/subtraction operation executed by the adder 1.

A left shifter 3 is connected to the output side of the adder 1. In order to execute the above normalization process, the left shifter 3 can execute left shift process using a shift amount control signal which is derived as the result of the Leading zero/one Anticipator (cancelling prediction circuit) 2. If carry is caused (i.e., carry becomes "1") at the bit at which generation of cancelling is predicted beforehand, this carry serves as one bit prediction error. Therefore, the prediction error detector can check the presence of such carry caused at the bit at is "1", the precancelling is predicted. If the carry is "1", the prediction error detector 4 can then correct such prediction error by rendering the right shifter 5 to shift the output of the left shifter 3 rightward by one bit.

Figure 5:
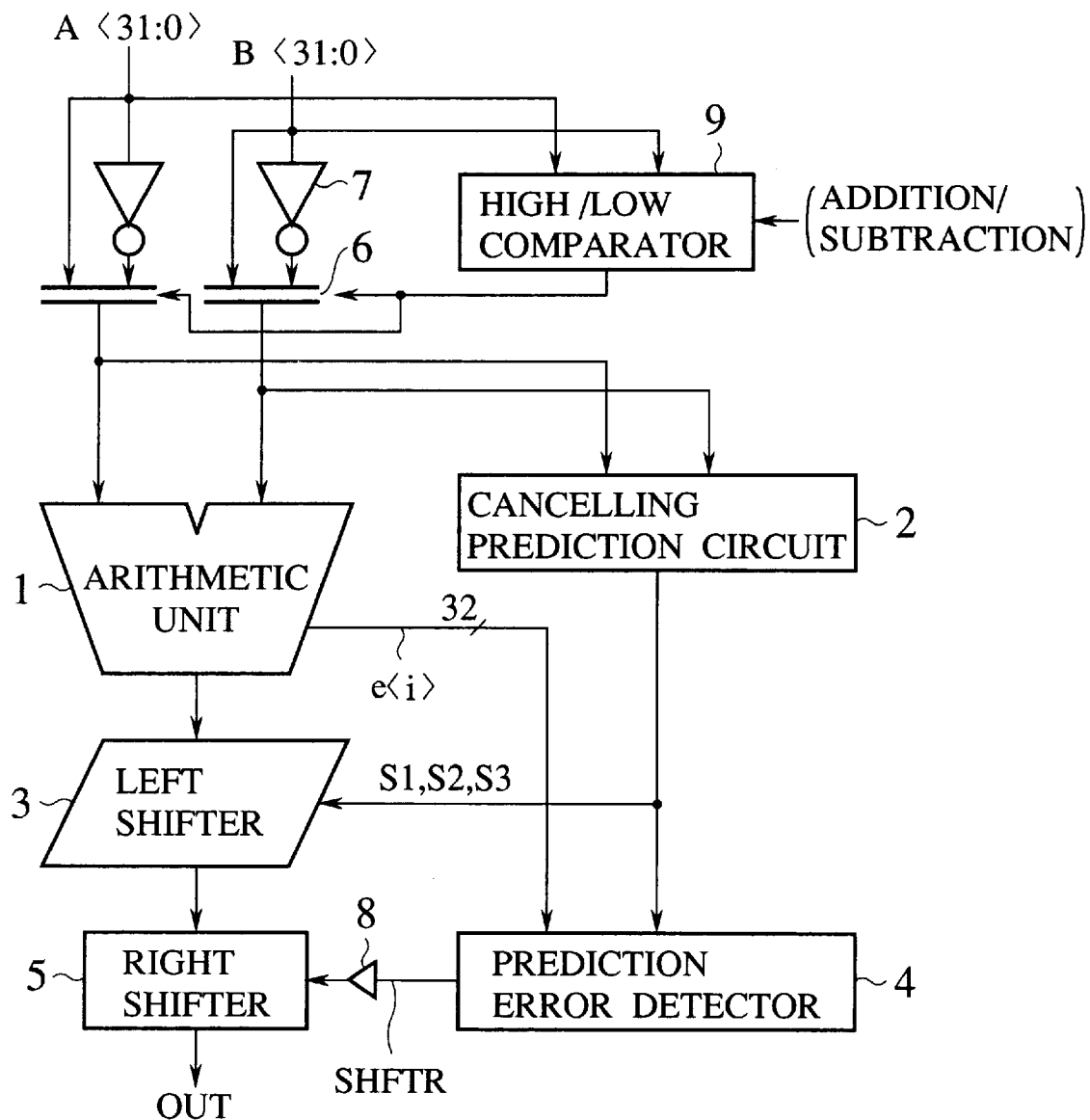
FIG. 5 is a block diagram showing another configuration of the floating-point arithmetic unit according to the first embodiment of the present invention to which a high/low comparator is provided.

In this disclosure, since, in the case of subtraction, it is assumed as a premise that the remainder (or the result) is always set to be positive, a high/low comparator 9 is provided, as needed, as shown in FIG. 5.

Next, configurations and operations of the Leading zero/one Anticipator (cancelling prediction circuit) 2, the left shifter 3, and the prediction error detector 4 which are characterizing constituent elements of the present invention will be explained in detail with reference to FIGS. 6 to 15 hereunder.

[1] Leading zero/one Anticipator (Cancelling prediction circuit) 2

Figure 6:
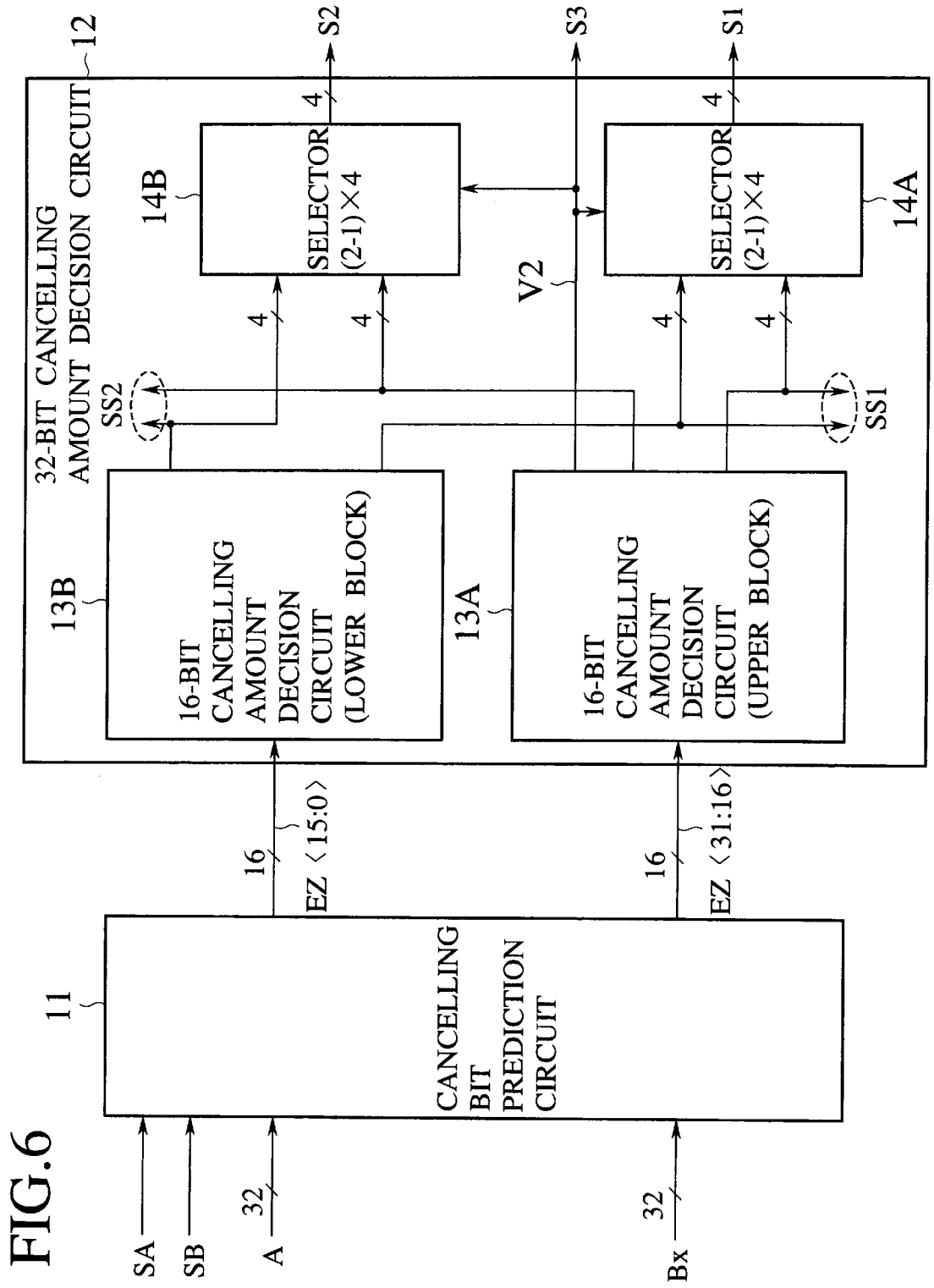
FIG. 6 is a block diagram showing a configuration of a Leading zero/one Anticipator (cancelling prediction circuit) 2 shown in FIG. 4.

As shown in FIG. 6, the Leading zero/one Anticipator (cancelling prediction circuit) 2 is made up of a cancelling bit prediction circuit 11 and a cancelling amount decision circuit 12. An explanation of the cancelling bit prediction circuit 11 and a cancelling amount decision circuit 12 will be made sequentially hereinbelow.

(1) Cancelling bit prediction circuit 11

The cancelling bit prediction circuit 11 can compare two operands with each other bit by bit, and then predict the most significant digit of the results of addition/subtraction according its comparison result. Assume that the operands are 32-bit data, the prediction results (cancelling prediction signals EZ) can be obtained as 32-bit patterns of "0", "1". The cancelling amount decision circuit 12 to be described later can then detect position or digit of the most significant bit (bit at which the cancelling is predicted) based on the output "1" bits.

Since a cancelling amount is predicted based on patterns of respective bits of two operands in the cancelling bit prediction circuit 11, carry generated from the lower bits is not considered. For this reason, if carry is generated from the bit at which cancelling is predicted in advance (i.e., the bit at which "1's" are output out of the cancelling prediction signal and which are also positioned at the most significant order), cancelling will be predicted for actually generated cancelling values as well as one additional value.

In turn, an operation of the cancelling bit prediction circuit 11 will be explained. In FIG. 6, symbols A, Bx denote 32-bit operand respectively; SA, SB, sign bit respectively; and EZ, 32-bit cancelling prediction signal. A logic for generating the cancelling prediction signal EZ can be given as follows. Where "and" denotes a logical product; "or", a logical sum; "xor", exclusive logical sum; and "not", negative logic.

g<i>=A<i> and Bx<i>, p<i>=A<i> xor Bx<i>, and z<i>=not (A<i> or Bx<i>) (for 0≦i<32)

g<32>=SA and SB p<32>=SA xor SB z<32>=not (SA or SB)

EZ<i>=(g<i+1> or z<i+1>) and (p<i> or g<i>)

Where in the case of subtraction, A>B is assumed as a premise and

Bx=not B, SA="0", and SB="1"

and in the case of addition,

Bx=B, SA="0" and SB="0".

(2) Cancelling amount decision circuit 12

When a cancelling amount detected by the cancelling amount decision circuit 12 is output in its fully encoded state, such cancelling amount must be decoded again according to a configuration of the left shifter 3. Hence, it is desirable that output format of this circuit is selected as the format by which preceding shifters can directly input as the shift amount selection control signal. For this reason, the cancelling amount decision circuit 12 does not digitize (encode completely) the cancelling amount, but encode partially the cancelling amount to thus output it.

In FIG. 6, portions other than the cancelling bit prediction circuit 11 correspond to the configuration of the cancelling amount decision circuit 12. The cancelling amount decision circuit 12 is equivalent to the 32-bit priority encoder in circuit function, but its result can be output not to be fully encoded as described above.

The 32-bit cancelling amount decision circuit 12 comprises two 16-bit cancelling amount decision circuits 13A (upper block side), 13B (lower block side), eight 2-1 selectors (×4) 14A, 14B connected to output sides of the cancelling amount decision circuits 13A, 13B respectively, and buffer circuits (not shown) (which are inserted, as the case may be, when the driving force is needed).

Figures 7A, 7B:
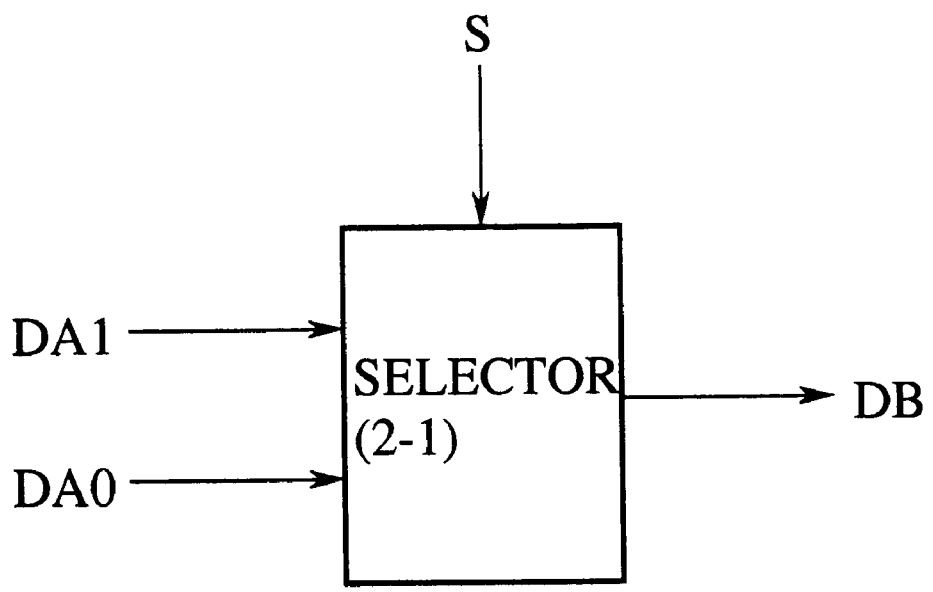
FIG. 7A is a view showing a truth table of respective 2-1 selectors 14A, 14B shown in FIGS. 6 and 7B.

In the 32-bit cancelling amount decision circuit 12, with the use of block active signal V2 output from the upper block side cancelling amount decision circuit 13A as the selection control signals, the 4-bit 2-1 selectors 14A, 14B can select the 4-bit first shift amount selection control signal S1 and the 4-bit second shift amount selection control signal S2 from the candidate SS1 of the first shift amount selection control signal S1 and the candidate SS2 of the second shift amount selection control signal S2, which are output from two 16-bit cancelling amount decision circuits 13A, 13B, and then output the 4-bit first shift amount selection control signal S1 and the 4-bit second shift amount selection control signal S2. FIG. 7A is a view showing a truth table of respective 2-1 selectors 14A, 14B shown in FIG. 7B (see FIG. 6).

FIG. 8 is a block diagram showing a configuration of respective 16-bit cancelling amount decision circuits 13A, 13B shown in FIG. 6.

Figures 9A, 9B:
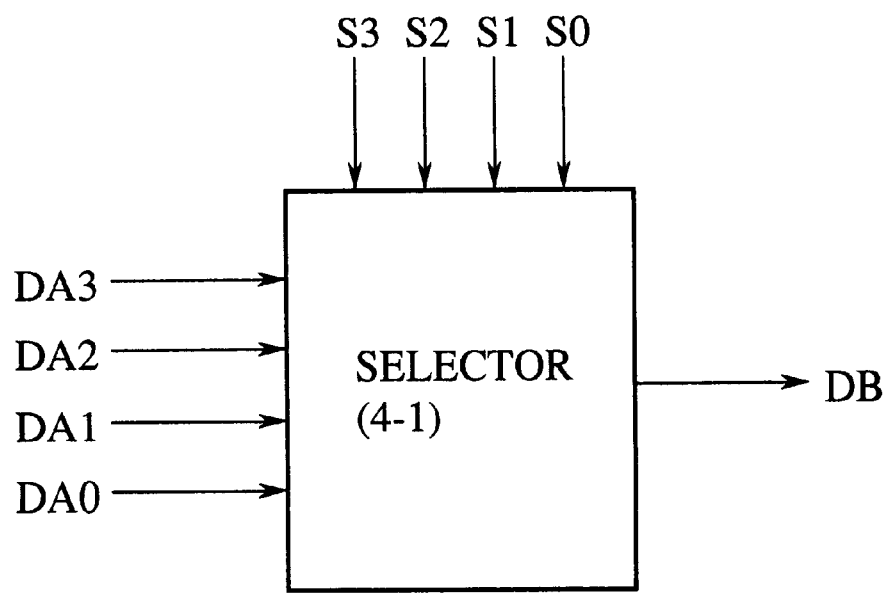
FIG. 9A is a view showing a truth table of a 4-1 selector 26 shown in FIGS. 8 and 9B.
Figures 10A, 10B:
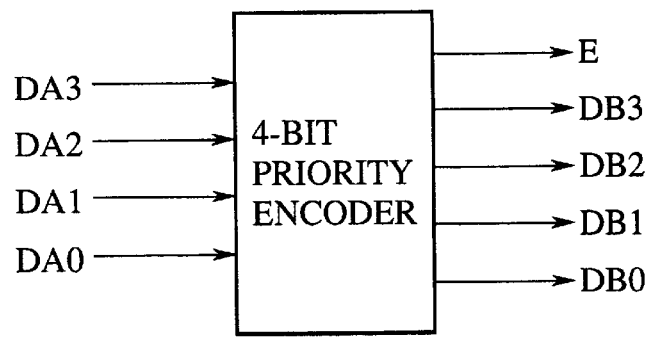
FIG. 10A is a view showing a truth table of respective 4-bit priority encoders 21, 22, 23, 24 and 25 shown in FIGS. 8 and 10B.

Each of the 16-bit cancelling amount decision circuits 13A, 13B comprises 4-bit cancelling amount decision circuits 21 to 24, a most significant block identifying circuit 25 for identifying the most significant block out of blocks in which cancelling is caused, four 4-1 selectors 26, and buffer circuits (not shown). The 4-bit cancelling amount decision circuits 21 to 24 can receive continuous 4-bits (one block) of a 16-bit cancelling prediction signal EZ respectively, and then identify the active most significant bit in continuous four bits and at the same time output the signal indicating whether or not generation of cancelling is present. The most significant block identifying circuit 25 can identify the most significant block out of the blocks in which cancelling is caused. In addition, the 4-1 selectors 26 can select an output signal (four bits) of the block, which has been identified by the most significant block identifying circuit 25, out of four blocks. Where FIG. 9A shows a truth table of a 4-1 selector 26 shown in FIG. 9B (see FIG. 6). As shown in FIGS. 6 and 8, in the cancelling amount decision circuit 12 in the first embodiment, the 32-bit cancelling prediction signal EZ is divided into two 16 continuous bits which are then classified into four blocks (one block as minimum unit is made up of continuous four bits) respectively. This is because the cancelling amount decision circuit 12 can be constructed easily if a hierarchical structure is employed and also a configuration of the left shifter 3 (FIG. 14) to which the shift amount selection control signal is output must be considered.

Next, an operation of the cancelling amount decision circuit 12 will be explained with reference to FIGS. 6 and 8 hereunder. The 4-bit cancelling amount decision circuits 21 to 24 are 4-bit priority encoders shown in FIG. 10B. More particularly, each of the 4-bit cancelling amount decision circuits 21 to 24 can receive the 16-bit cancelling prediction signals EZ, and then generate the first candidate SS0 of the first shift amount selection control signal S1. In other words, position of the most significant bit out of the bits at which the cancelling prediction signals EZ of "1" are input can be output as the first SSS1 of the first shift amount selection control signal S1. Then, even if the cancelling prediction signals EZ are "1" at least one bit of four input bits, the first block active signal V1 (output E in FIG. 10) is turned into "1".

Hierarchical structures of this can provide the 16-bit cancelling amount decision circuits 13A, 13B. Priority of four first block active signals V1 output from four 4-bit cancelling amount decision circuits 21 to 24 is checked herein. In other words, the most significant block in which cancelling is caused can be identified by the most significant block identifying circuit 25. For this reason, the most significant block identifying circuit 25 can also be formed by a 4-bit priority encoder shown in FIG. 10.

More specifically, the most significant block identifying circuit 25 can receive the first block active signals VI having total four bits which are output from the 4-bit cancelling amount decision circuits 21 to 24 corresponding to respective four blocks, and then output the candidate SS2 of the second shift amount selection control signal S2. The candidate SS2 of the second shift amount selection control signal S2 is a 4-bit signal, and only one bit out of four bits corresponds to the most significant block becomes "1". In addition, even if at least one of the first block active signals VI having total four bits which are output from the 4-bit cancelling amount decision circuits 21 to 24, the second block active signals V2 are turned into "1".

Moreover, using the candidate SS2 of the second shift amount selection control signal S2 as the selection control signal, four 4-1 selectors 26 can select the second candidate SS1 of the first shift amount selection control signal S1 from the candidate SSS1 (4 bits×4 blocks) of the first shift amount selection control signal S1.

That is, the 16-bit cancelling amount decision circuits 13A, 13B can receive 16-bit (4 bits×4 blocks) cancelling prediction signals EZ respectively, and then output the candidate SS1 of the 4-bit first shift amount selection control signal S1, the candidate SS2 of the 4-bit second shift amount selection control signal S2, and the second block active signal V2.

Like the above, in the 32-bit cancelling amount decision circuit 12, the candidates SS1 of the 4-bit first shift amount selection control signals S1, which have four bits (4 bits×2) respectively, and the candidates SS2 of the 4-bit second shift amount selection control signals S2, which have four bits (4 bits×2) respectively, can be obtained by two 16-bit cancelling amount decision circuits 13A, 13B respectively. And, using the second block active signals V2 output from the upper block side cancelling amount decision circuit 13A as the selection control signals, the four 2-1 selectors 14A, 14B can select the 4-bit first shift amount selection control signal S1<3:0> and the 4-bit second shift amount selection control signal S2<3:0> and then output them. In addition, the second block active signals V2 can be output as the third shift amount selection control signal S3.

In other words, the 32-bit cancelling amount decision circuit 12 can receive the 32-bit (16 bits×2) cancelling prediction signals EZ<31:0>, and then output the 4-bit first shift amount selection control signal S1<3:0>, the 4-bit second shift amount selection control signal S2<3:0>, and the third shift amount selection control signal S3.

In turn, the 4-bit priority encoders 21 to 24 and 25 acting as basic constituent elements of the 32-bit cancelling amount decision circuit 12 will be explained with reference to the truth table shown in FIG. 10.

Outputs of the 4-bit priority encoders can be directly output to the left shifter 3 to be described later. Namely, the encoders have a simple and most suitable structure to output the first, second, third shift amount selection signals S1, S2, S3.

As shown in the truth table in FIG. 10, DB<3:0>="1000" when DA<3> becomes the most significant bit, DB<3:0>= "0100" when DA<2> becomes the most significant bit, DB<3:0>="0010" when DA<1> becomes the most significant bit, and DB<3:0>="0001" when only DA<0> becomes "1". If all inputs are "0's", DB<3:0>="0001" and only one bit always becomes "1". This is because succeeding selectors and shifters are implemented with path transistors and also such a situation that outouts of the path transistors are not brought into their high impedance states is taken into consideration.

[2] Left shifter (Normalization circuit) 3

Figure 11:
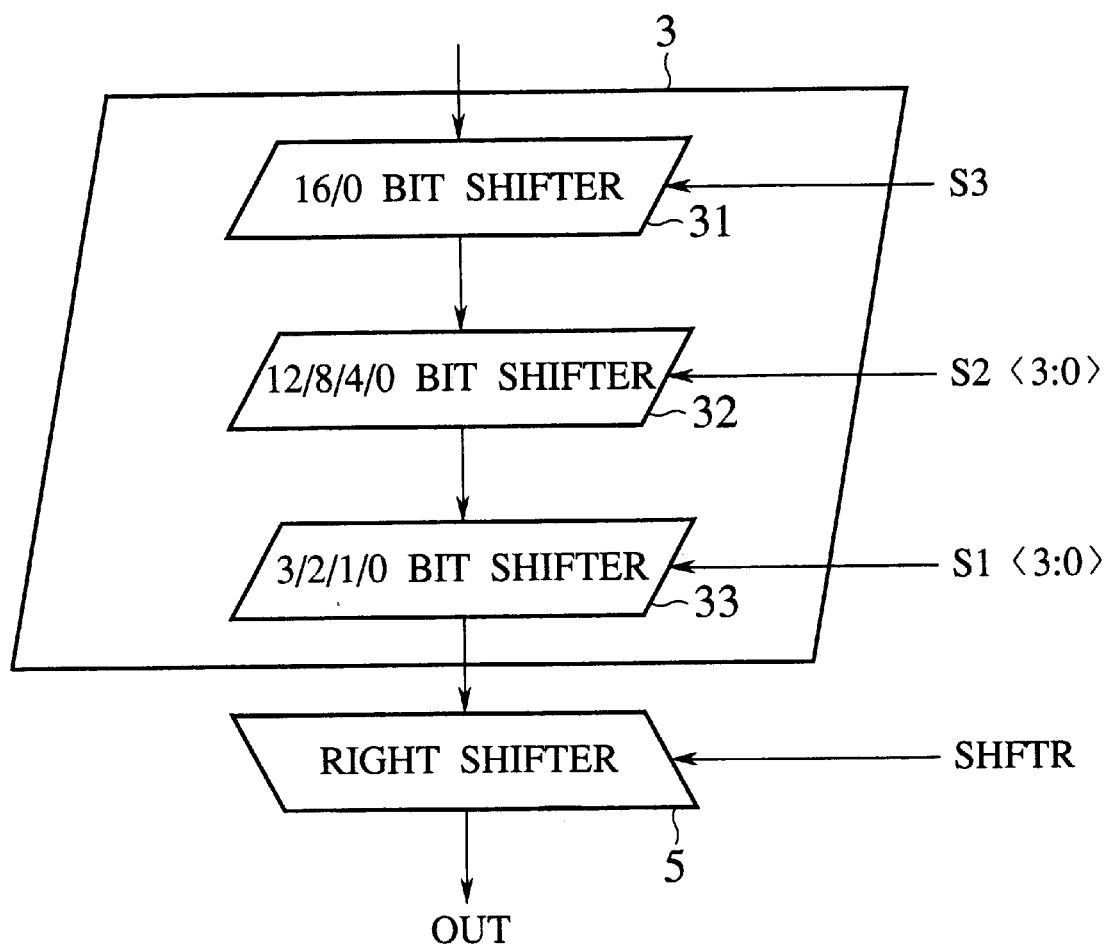
FIG. 11 is a block diagram showing configurations of a left shifter 3 and a right shifter 5 shown in FIG. 4.

FIG. 11 is a block diagram showing a configuration of the left shifter 3 shown in FIG. 4. In FIG. 11, the left shifter 3 as well as the right shifter 5 is depicted.

The left shifter 3 comprises a 16/0 bit shifter 31, a 12/8/4/0 bit shifter 32, and a 3/2/1/0 bit shifter 33 and a variable left shifter which can shift respective bits from the 0 bit to the 31 bit. The signals S3, S2<3:0>, and S1<1:0> are shift amount selection control signals supplied to the 16/0 bit shifter 31, the 12/8/4/0 bit shifter 32, and the 3/2/1/0 bit shifter 33 respectively. The right shifter 5 can execute the right shift to execute one bit error correction in an opposite direction to the left shifter 3. At that time, a control signal SHFTR which is the detection result of the prediction error detector 4 can decide whether or not one bit error correction shift must be carried out.

FIGS. 12A, 12B, 12C are tables showing relationships between shift amount selection control signals S3, S2, S1 and respective shift amounts in respective bit shifters 31, 32, 33 shown in FIG. 11. For example, when S3 ="0", S2<3:0>= "0100", and S1<3:0>="0010", a total shift amount (in the left direction) can be given as 16+4+2=22 bits. In addition, the shift amount selection control signals S2<3:0> and S1<3:0> are decided to have their outputs such that only one bit becomes "1" without fail. Where FIG. 12D also shows the relationship between the signal SHFTR and the shifting operation in the right shifter 5.

[3] Prediction error detector 4

If the carry is generated from the bit at which generation of the cancelling is predicted beforehand, such carry can serve as one bit prediction error. Therefore, if the carry is "1" when the carry at which generation of the cancelling is predicted is examined, the calculated result is shifted right by one bit, so that the prediction error can be corrected.

Figure 13:
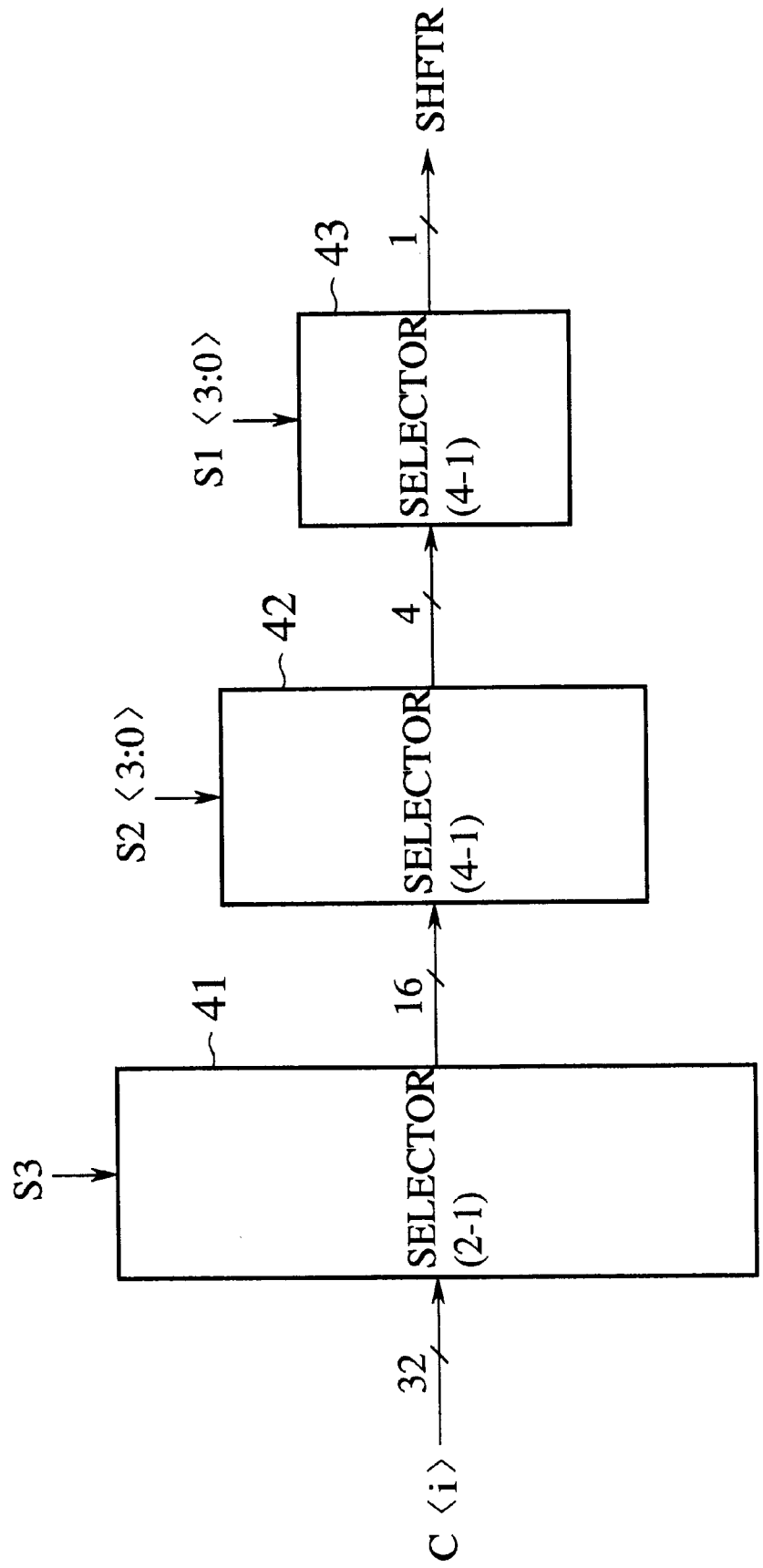
FIG. 13 is a block diagram showing a configuration of a prediction error detector 4 shown in FIG. 4.
Figure 14:
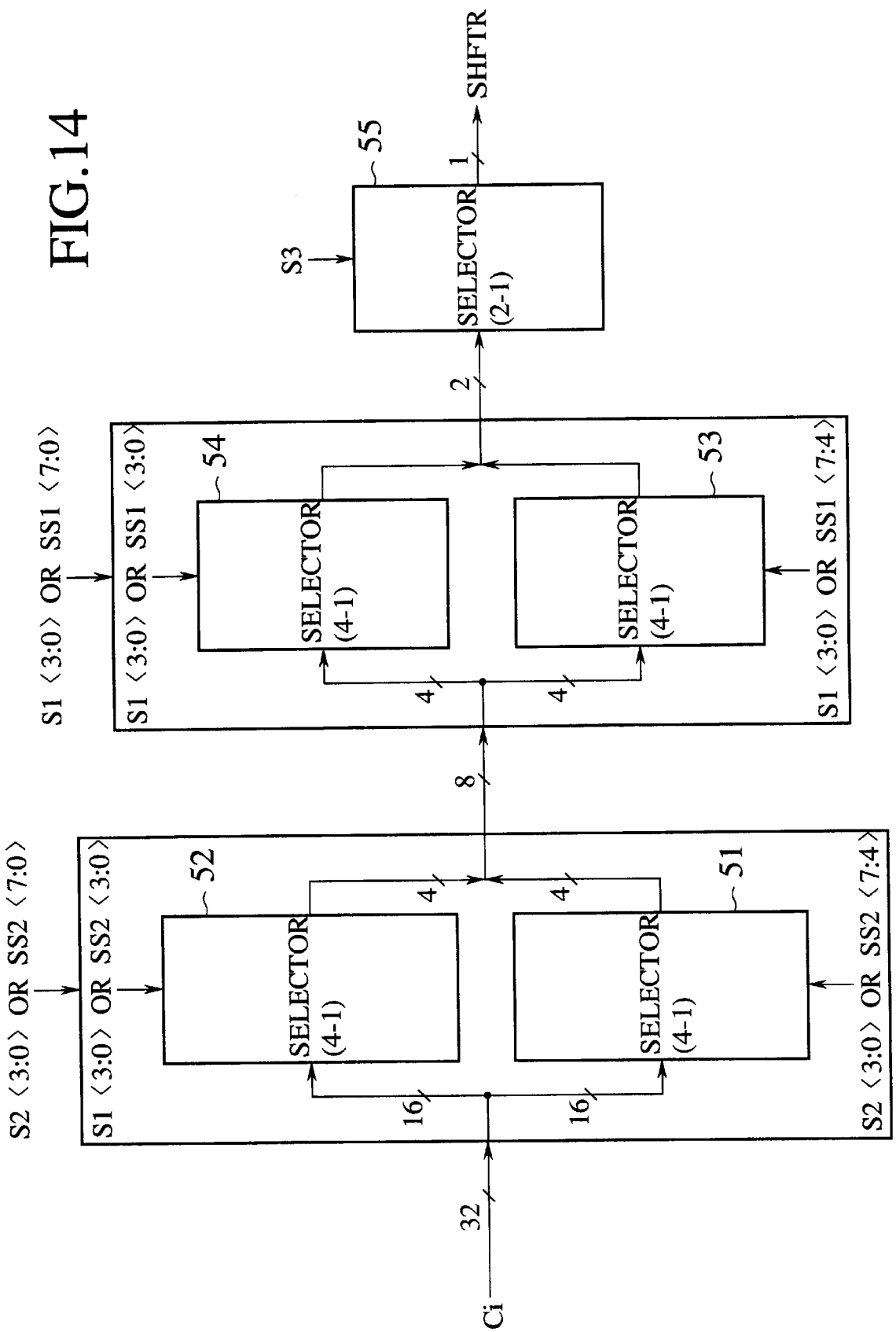
FIG. 14 is a block diagram showing another configuration of the prediction error detector 4 shown in FIG. 4.

FIG. 13 is a block diagram showing a configuration of a prediction error detector 4 shown in FIG. 4. FIG. 14 is a block diagram showing another configuration of the prediction error detector 4 shown in FIG. 4.

The prediction error detector 4 can receive a 4-bit first shift amount selection control signal S1, a 4-bit second shift amount selection control signal S2, and a third shift amount selection control signal S3 as selection control signals. Based on the final carry signal C<i> (this represents the carry signal at the i-th bit) of respective bits which are output from the 32-bit adder 1, the prediction error detector 4 can then select the carry signal of the concerned bit at which generation of the cancelling is predicted. In other words, when such a situation that the cancelling is generated at the bit <i> is predicted, the final carry signal C<i> is selected.

In respective examples shown in FIGS. 13 and 14, the selectors (the 2-1 selector, and the 4-1 selectors) are arranged differently in order. However, such arrangement is decided according to a trade-off between settling times of respective shift selection signals and the wiring layout. Hence, the prediction error detector 4 can be achieved even if the arrangement of the selectors is replaced with another arrangement other than these arrangements.

Therefore, an example in FIG. 13 will be explained hereunder. The third shift amount selection control signal S3 is supplied to the 2-1 selector 41 to select that the bit position <k> at which generation of the cancelling is predicted belongs to either the lower 16-bit side or the upper 16-bit side (i.e., k belongs to either 0≦k≦15 or 16≦k≦31). Selected 16-bits can be classified into four 4-bit blocks. Therefore, the second shift amount selection control signal S2 is supplied to the 4-1 selector 42 to select the concerned block out of four blocks, whereby the 4-bit signal can be selected. Finally, the first shift amount selection control signal S1 is supplied to the 4-1 selector 43 to select the carry signal C<k> at the concerned bit of four bits in the selected block. According to these operations, bit position of the finally selected carry signal C<k> coincides with the bit <k> which has been predicted by the cancelling amount decision circuit 12. At this time, if the carry signal C<k> is "1", the control signal SHFTR is output to the right shifter 5 which serves as the one bit error correction shifter (reverse shifter) such that the arithmetic result is shifted rightward to correct the error.

In contrast, in an example in FIG. 14, first of all, using the second shift amount selection control signal S2<3:0>, or a candidate SS2<7:0> of the second shift amount selection control signal S2, 4-bit blocks can be selected from the upper 16-bit block and the lower 16-bit block by the 4-1 selectors 51, 52 respectively. Then, using the first shift amount selection control signal S1<3:0>, or a candidate SS1<7:0> of the first shift amount selection control signal S1, bit positions can be identified every 16-bit block by the 4-1 selectors 53, 54 respectively. Finally, using the third shift amount selection control signal S3, the carry C<k> which corresponds to the bit <k>predicted by the cancelling prediction circuit 12 can be identified by the 2-1 selector 55.

Normally, a timing defined by the third shift amount selection control signal S3 is earlier than a timing defined by the first shift amount selection control signal S1<3:0> or the second shift amount selection control signal S2<3:0>. For this reason, like the example shown in FIG. 14, if the candidate SS2<7:0> or SS1<7:0> which is defined earlier than the control signal S2<3:0> or S1<3:0>is employed, prediction error detecting process can be started at an earlier timing.

Figure 15:
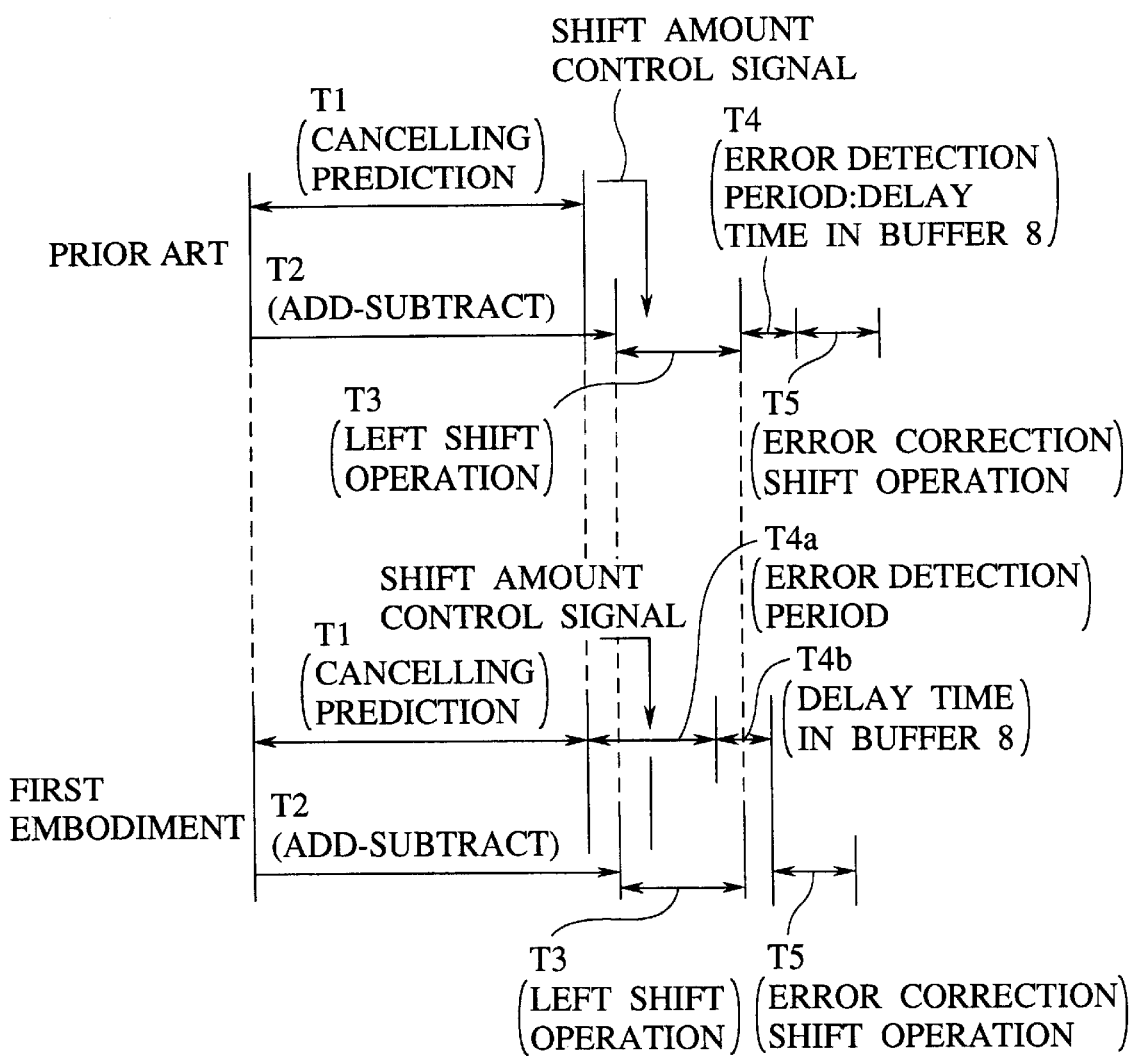
FIG. 15 is a view illustrating an advantageous effect achieved by the floating-point arithmetic unit according to the first embodiment of the present invention.

If the selectors shown in FIG. 13 or FIG. 14 are supposed as path transistors like the shifters, delay times in these selectors can be considered as in the shifters. In addition, the carry signals C<i> of respective bits are defined earlier (by a time which is equivalent to a delay time in one stage of the exclusive logical sum) than that the final sum of the adder 1 is defined. Hence, as shown in FIG. 15, a defining time required for the prediction error detection (period T4a in FIG. 15) becomes earlier than a defining time required for the definition of the arithmetic result via the left shifter 3 (period T3). For this reason, if it can be supposed that a total period of the delay time in the buffer 8 to drive the right shifter 5 (period T4b in FIG. 15) and the period required for the error correction shift operation executed by the right shifter 5 (period T5 in FIG. 15) is the same as that in the prior art, a timing starting to drive the buffer 8 becomes earlier than that in the prior art. As a consequence, the arithmetic result OUT can also be output earlier by such time period than the prior art.

Second Embodiment

Next, a second embodiment of the present invention will be explained in detail with reference to FIGS. 16 to 19 hereunder.

Figure 16:
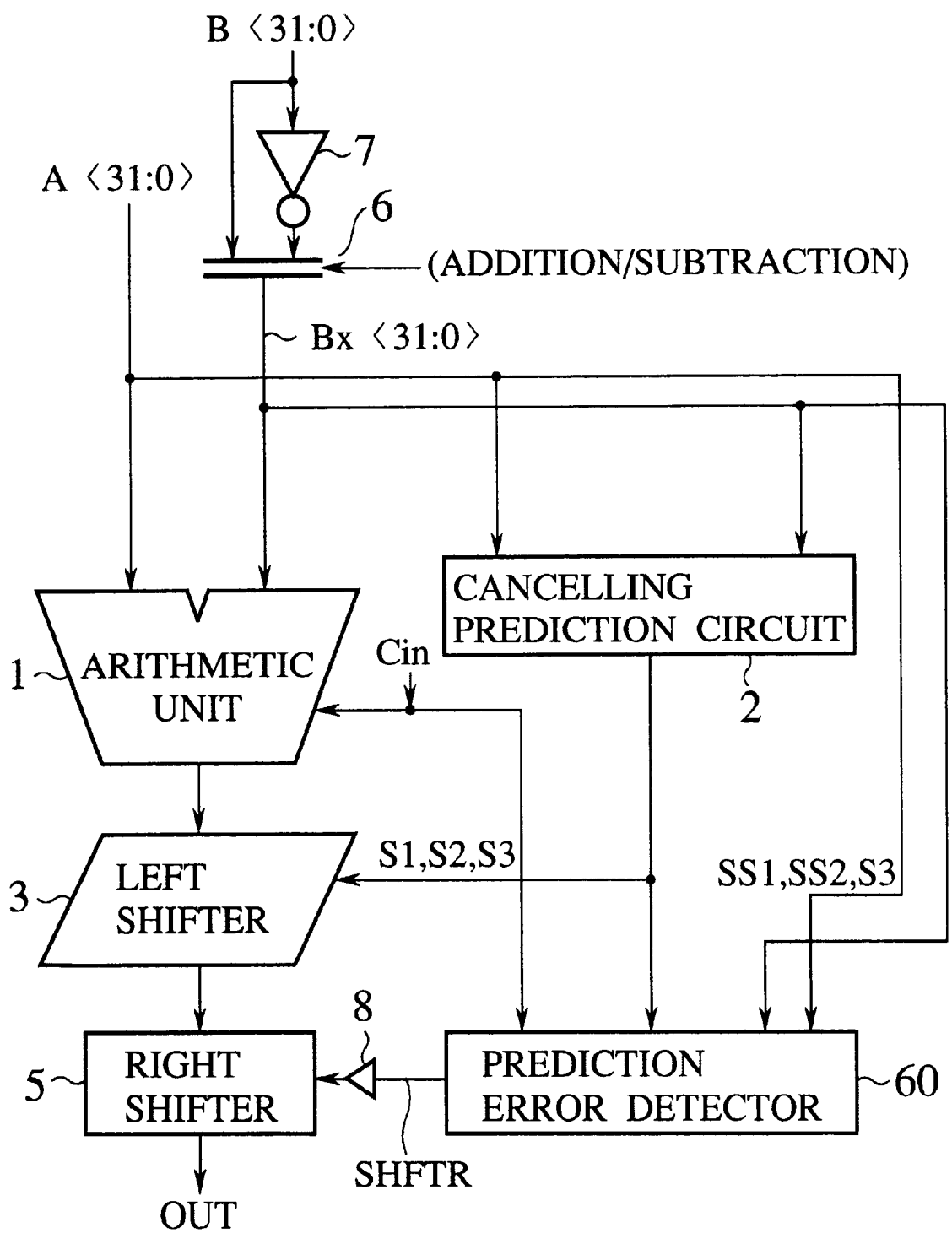
FIG. 16 is a block diagram showing a configuration of a floating-point arithmetic unit according to a second embodiment of the present invention.

FIG. 16 is a block diagram showing a configuration of a floating-point arithmetic unit according to the second embodiment of the present invention. In FIG. 16, the same references are applied to the same elements as those in FIG. 4 and therefore their explanation will be omitted herein.

In the floating-point arithmetic unit according to the second embodiment, the prediction error detector 4 is replaced with a new prediction error detector 60 in the configuration of the first embodiment shown in FIG. 4 so as to add carry-in signals Cin to the least significant bit.

In other words, in the prediction error detecting system according to the second embodiment, the signals for generating the carry of the concerned bits (the carry generation signal, the carry propagation signal) can be identified at the same time when the bits at which generation of the cancelling is predicted can be identified in the course of generation of the carry in the adder 1.

Figure 17:
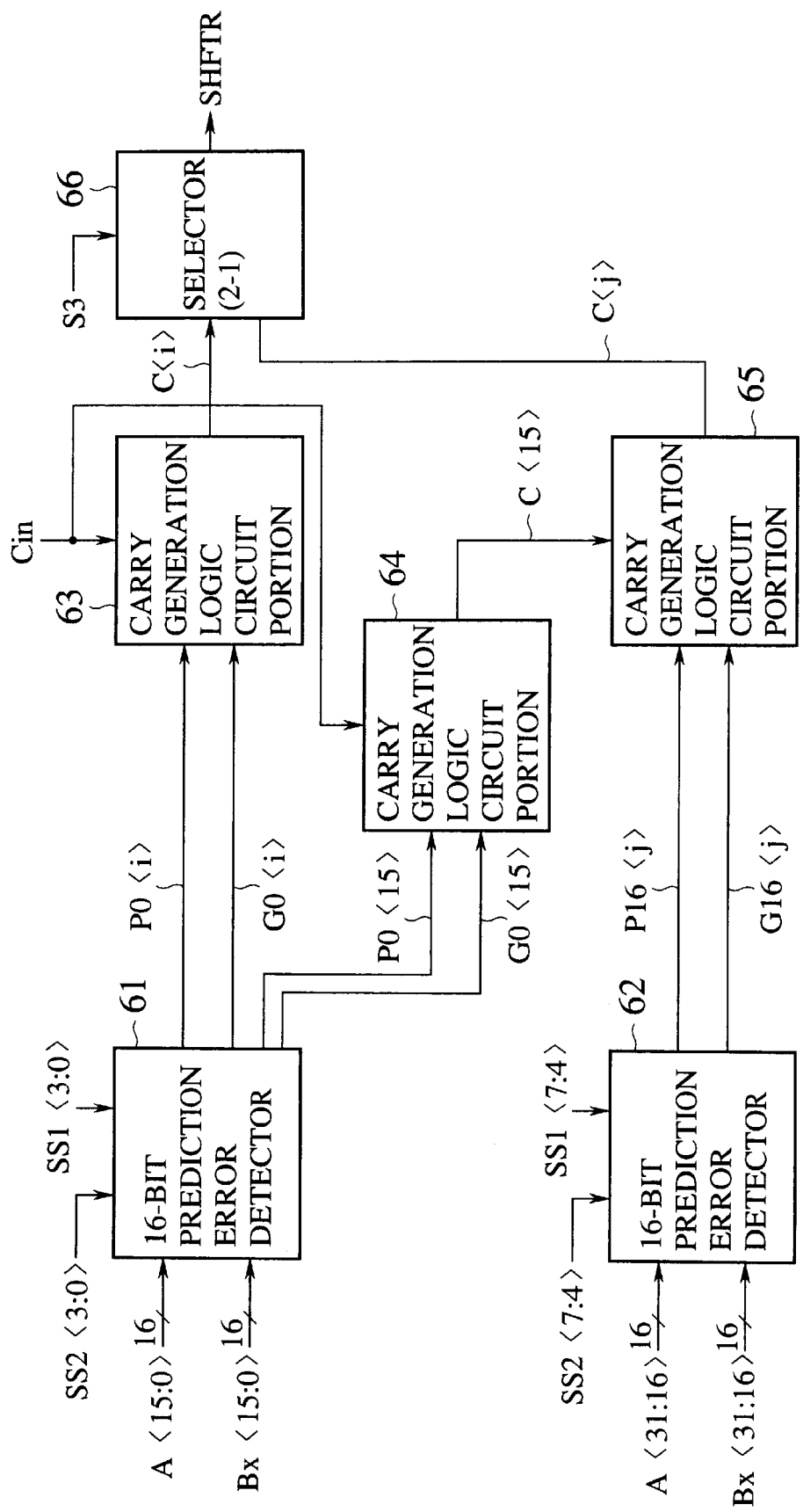
FIG. 17 is a block diagram showing a configuration of a prediction error detector 60 in the floating-point arithmetic unit in the shown in FIG. 16.

FIG. 17 is a block diagram showing a configuration of the prediction error detector 60 used to implement the prediction error detecting system according to the second embodiment.

This prediction error detector 60 comprises 16-bit prediction error detectors 61, 62 into which upper 16-bit and lower 16-bit signals obtained by classifying 32 bits are input respective, carry generation logic circuit portions 63, 64, 65, and a 2-1 selector 66.

Figure 18:
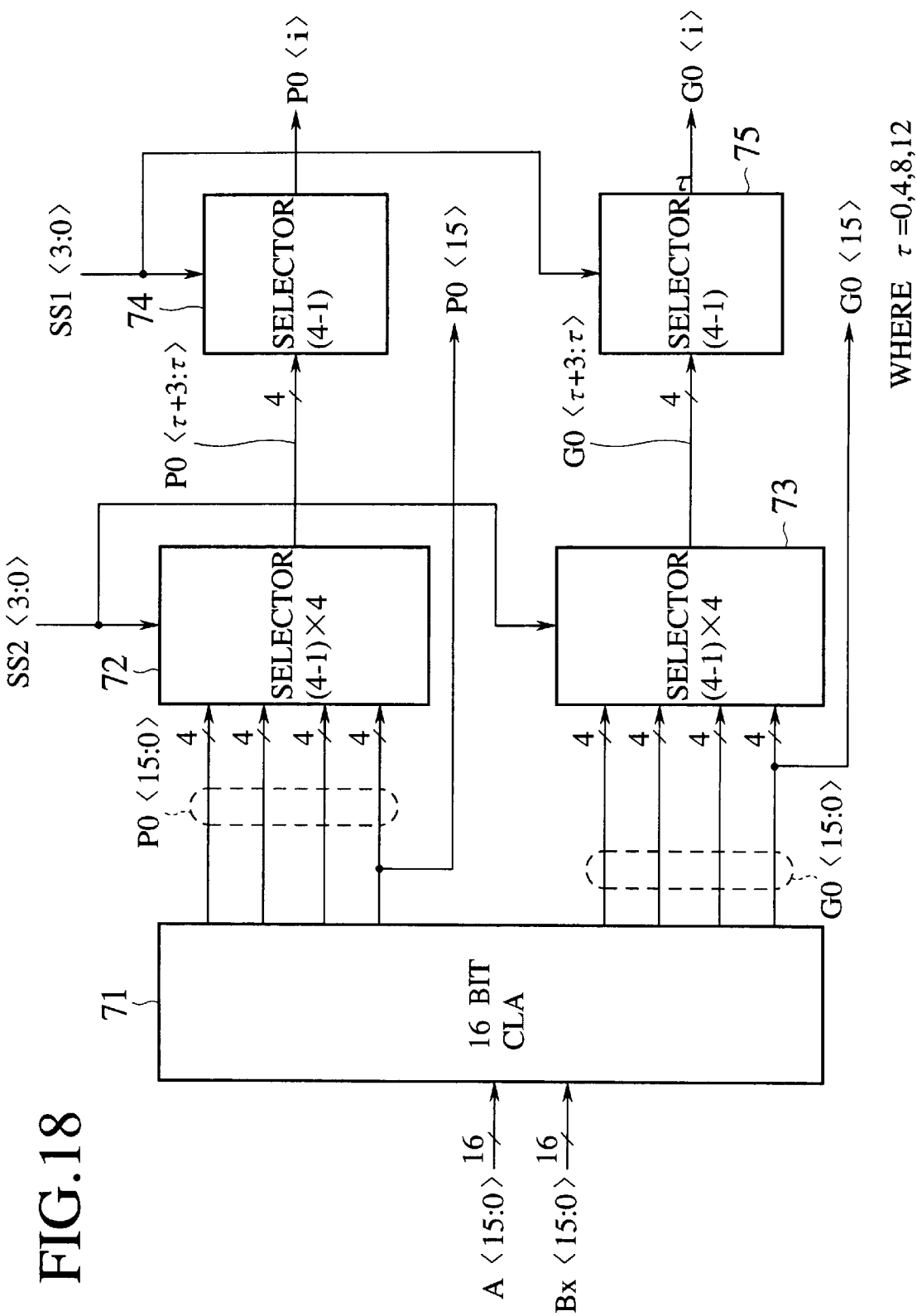
FIG. 18 is a block diagram showing a configuration of a 16-bit prediction error detectors 61 shown in FIG. 17.

FIG. 18 is a block diagram showing a detailed configuration of a 16-bit prediction error detectors 61 shown in FIG. 17.

This prediction error detectors 61 comprises a 16-bit CLA (Carry Lookahead Adder) adder 71, eight 4-1 selectors 72, 73 (×4), and two 4-1 selectors 74, 75.

The 16-bit CLA adder 71 can output a 16-bit signal P0<15:0> and a 16-bit signal G0<15:0>. The signals G0, P0 are the carry generation signal and the carry propagation signal which are generated from the bit<0> in the CLA type adders respectively. The 4-1 selectors 72, 73 can select sequential 4 bits ({P0<τ+3:τ>, G0<τ+3:τ>}, where τ=0, 4, 8, 12) from sequential 16-bit signals P0<15:0> and sequential 16-bit signals G0<15:0> respectively.

Similarly, a configuration of the 16-bit prediction error detector 62 is basically identical to that of the prediction error detectors 61 shown in FIG. 18. In this configuration, the input signals can be replaced with signals A<31:16>, Bx<31:16>, SS2<7:4>, SS1<3:0>respectively, the output signals can be replaced with signals P16<j>, G16<j> respectively, and signals corresponding to the signals P0<15>, G0<15> can be omitted.

Subsequently, operations of the prediction error detectors 61, 62 will be explained with reference to FIG. 18 hereunder.

The candidate SS2<7:0> of the 4-bit second shift amount selection control signal S2 is used as the selection control signal. Since the candidate SS2<7:0> can be defined at an earlier timing than the signals S2<3:0> and S1<3:0>, the prediction error detecting process can be started earlier.

The candidate SS2<7:4> of the second shift amount selection control signal S2 of the upper 16-bit cancelling amount decision circuit 13A is supplied to the upper 16-bit block, while the candidate SS2<3:0> of the second shift amount selection control signal S2 of the lower 16-bit cancelling amount decision circuit 13B is supplied to the lower 16-bit block. Therefore, pairs of 4-bit carry generation signals and 4-bit carry propagation signals can be selected in the 16-bit prediction error detectors 61, 62 respectively.

In addition, it is the candidate SS1<7:0> of the first shift amount selection control signal S1 that can select pairs of 1-bit carry generation signals and 1-bit carry propagation signals from the pairs of 4-bit carry generation signals and 4-bit carry propagation signals. More particularly, in the same manner that the pairs of 4-bit carry generation signals and 4-bit carry propagation signals are selected from the pairs of 16-bit carry generation signals and 16-bit carry propagation signals {Gi<i+15:i>, Pi<i+15:i>, i=0, 16} respectively, the candidate SS1 <7:0> can select the pairs of 1-bit carry generation signals and 1-bit carry propagation signals {Gj<i+j>, Pj<i+j>, 0<i≦15, j=0, 16} from the pairs of 4-bit carry generation signals and 4-bit carry propagation signals {Gj<i+j+3:i+j>, Pj<i+j+3:i+j>, i=0, 4, 8, 12, j=0, 16} respectively.

In this case, the candidate SS1<7:4> of the upper block first shift amount selection control signal is used for the selection in the upper block whereas the candidate SS1<3:0> of the lower block first shift amount selection control signal is used for the selection in the lower block.

In FIG. 17, the carry generation logic circuit portions 63, 64, 65 can generate final carry signals based on the carry-in signal Cin supplied to the least significant bit, the carry generation signal, and the carry propagation signal. More specifically, in the carry generation logic circuit portion 63, C<i>=(G0<i> or (P0<i> and Cin)) (0≦i≦15) can be generates based on the signal Cin and the signals {P0<i>, G0<i> (0≦i≦15)}. In the carry generation logic circuit portion 64, C<15>=(G0<15> or (P0<15> and Cin)) can be generates based on the signal Cin and the signals P0<15>, G0<15>. In the carry generation logic circuit portion 65, C<j>=(G16<j> or (P16<j> and C<15>)) (16≦j≦31) can be generates based on the signal C<15> and the signals {P16<j>, G16<j> (16≦j≦31)}.

By use of the third shift amount selection control signal S3 as the selection control signal, either one of the carry signals C<i> and C<j> (0≦i≦15, 16≦j≦31) which are output from the carry generation logic circuit portions 63, 65 respectively can be selected in the 2-1 selector 66. This finally selected carry signal can act as the carry signal C<k> at the bit which coincides with the bit <k> predicted by the Leading zero/one Anticipator (cancelling prediction circuit) 2. If this carry signal C<k> is "1", the control signal SHFTR can be output to the right shifter such that the arithmetic result is shifted rightward by one bit so as to correct the error.

Figure 19:
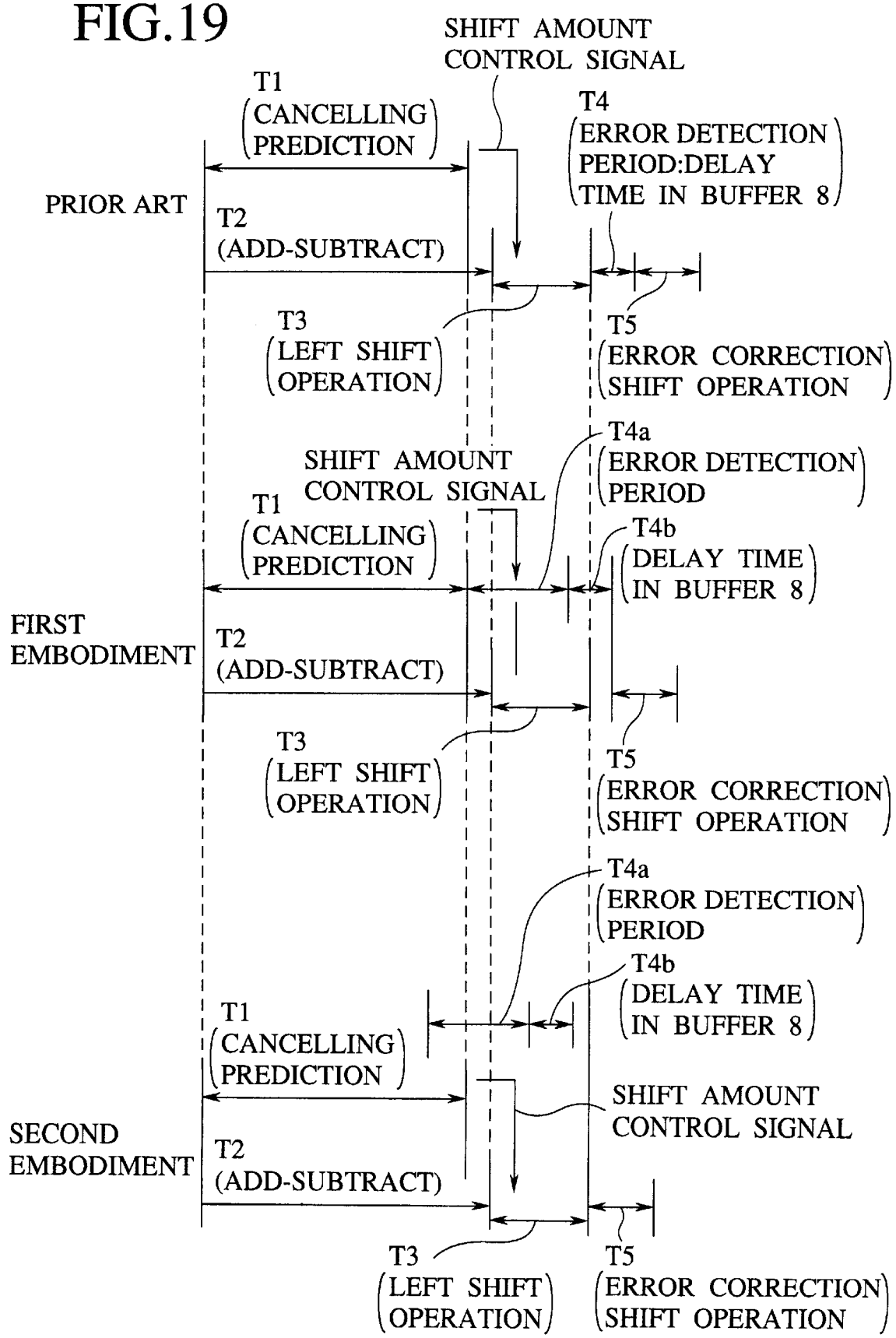
FIG. 19 is a view illustrating an advantageous effect achieved by the floating-point arithmetic unit according to the second embodiment of the present invention.

According to the second embodiment, as shown in FIG. 19, since an operation for detecting the presence of the cancelling prediction error can be started earlier than the above first embodiment before the final carry signals of respective bits are defined in the adder 1, it can be detected earlier than the above first embodiment whether or not the cancelling prediction error is present. As a result, the floating-point arithmetic result OUT can be derived earlier than the above first embodiment.

In the second embodiment, the block for the CLA adder 71 in the prediction error detector 4 has been set to 16 bits. However, the configuration of the CLA adder 71 can be modified with regard to the timings when the candidate SS1<7:0> of the first shift amount selection control signal and the candidate SS2<3:0> of the second shift amount selection control signal can be defined.

In the above first and second embodiments, a bit width of calculation has been set to 32 bits. However, in case the bit width of calculation is changed, such change can be coped with flexibly by modifying the hierarchical structure correspondingly.

Also, in the above first and second embodiments, in the case of subtraction, there has been a necessity of executing an exchange operation of two numbers with regard to the high/low relationship between two numbers such that the result becomes positive when two numbers are compared with each other by the high/low comparator (a multiplexer 6 in FIG. 5). In a third embodiment to be described in the following, it is not assumed as the premise that the result becomes positive even in the subtraction.

Third Embodiment

Next, a third embodiment of the present invention will be explained in detail with reference to FIGS. 20 to 25 hereunder.

Figure 20:
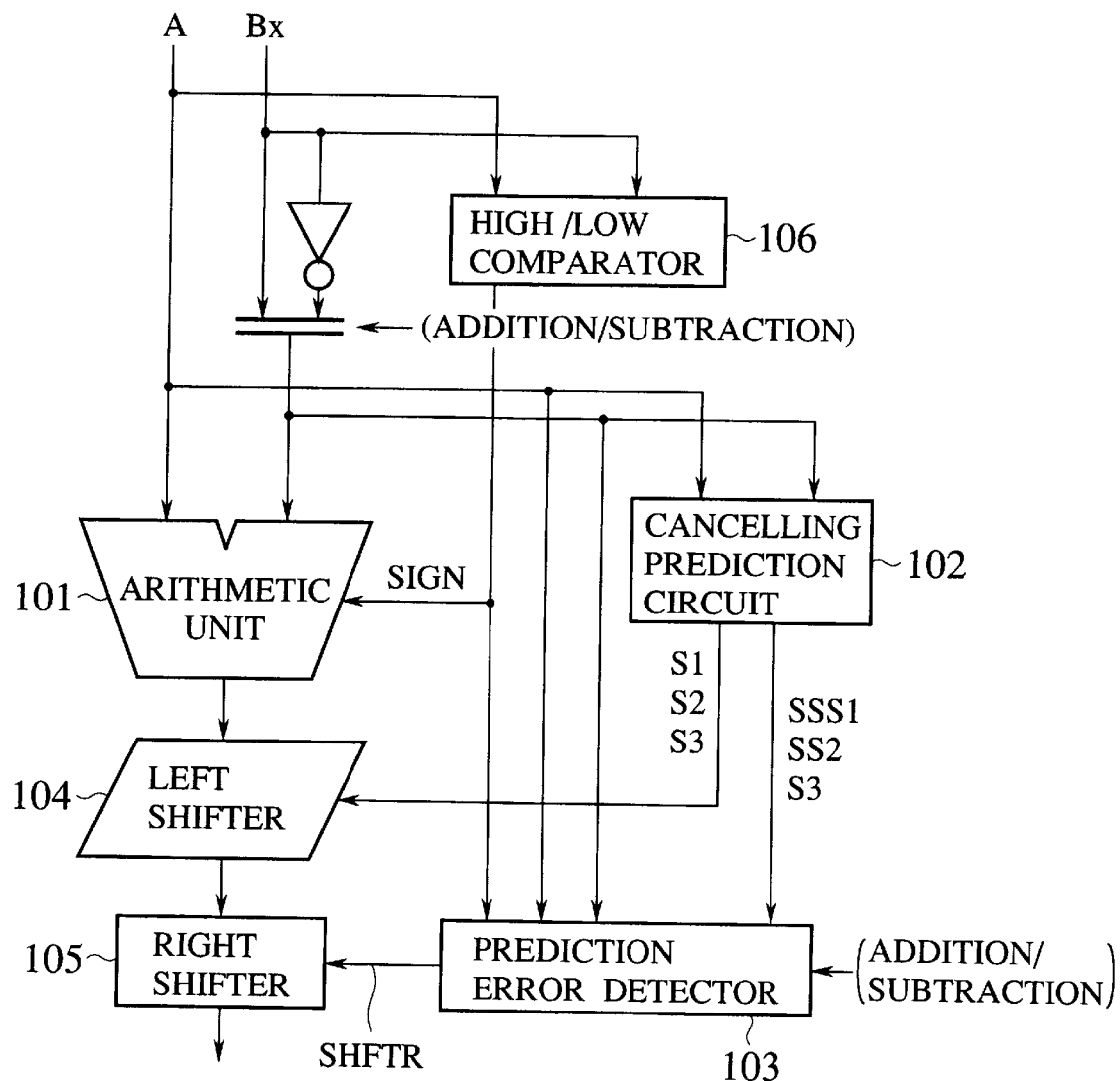
FIG. 20 is a block diagram showing a configuration of a floating-point arithmetic unit according to a third embodiment of the present invention.

FIG. 20 is a block diagram showing a configuration of a floating-point arithmetic unit according to the third embodiment of the present invention. The arithmetic unit 101 can be operated in parallel not to provide a high/low comparator 106 at a preceding stage of the arithmetic unit. Therefore, in the case of subtraction, there is possibility that the result or the remainder becomes negative. Since FIG. 20 does correspond to FIG. 4, its redundant explanation will be omitted from this disclosure.

Although the cancelling bit prediction circuit as shown in FIG. 6 is also provided in FIG. 20, a logic for generating the cancelling prediction signal EZ herein will be given as follows under the assumptions that A, Bx are 32-bit operands and that SA, SB are sign bits.

g<i>=A<i> and Bx<i>,
p<i>=A<i> xor Bx<i>,
z<i>=not (A<i> or Bx<i>) (for 0≦i≦32)
g<32>=SA and SB,
p<33>=p<32>=SA xor SB,
z<32>=not (SA or SB),
EZ<i>=((not p<i+2>) and ((g<i+1> and (not g<i>)) or (z<i+1> and (not z<i>)))) or ((p<i+2>) and ((g<i+1> and (not z<i>)) or (z<i+1> and (not g<i>))))

Where in the case of subtraction,
Bx=not B, SA="0", and SB="1"
and in the case of addition,
Bx=B, SA="0" and SB="0".

Unlike the first embodiment and the second embodiment, generation of the cancelling prediction signal EZ is not affected by the high/low relationship of A, B. The Leading zero/one Anticipator (cancelling prediction circuit) 102 corresponds to the Leading zero/one Anticipator (cancelling prediction circuit) 2 which has been explained with reference to FIG. 6, and is composed of the cancelling bit prediction circuit and the cancelling amount decision circuit. Similarly, its redundant explanation will be omitted.

Figure 21:
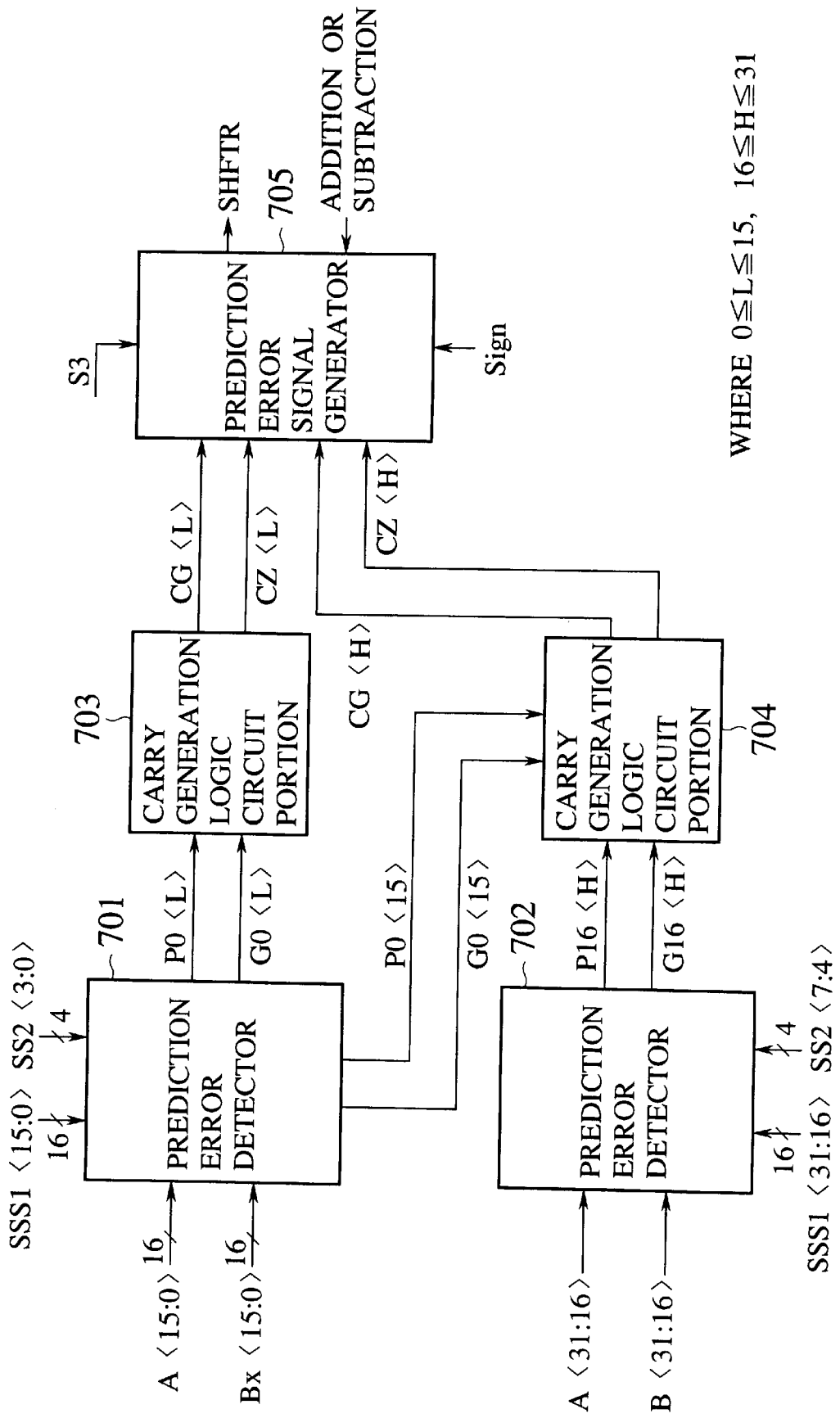
FIG. 21 is a block diagram showing a configuration of a prediction error detector 103 in the floating-point arithmetic unit shown in FIG. 20.

FIG. 21 shows a configuration of a 32-bit prediction error detector 103 in the floating-point arithmetic unit shown in FIG. 20. The configuration and an operation of the prediction error detector 103 will be explained with reference to FIG. 21. It is assumed that 32-bit data are handled herein so as to correspond to the Leading zero/one Anticipator (cancelling prediction circuit) 102. The prediction error detector 103 comprises a lower 16-bit prediction error detector 701, an upper 16-bit prediction error detector 702, carry generation logic circuit portions 703, 704, and a prediction error signal generator 705.

The prediction error detector 103 can identify the carry generated from the bit at which generation of the cancelling is predicted, by use of intermediate state signals of the cancelling amount decision circuit, and can also detect the prediction error based on the result of the high/low comparator.

Input signals are p signals (carry propagation signals) and g signals (carry generation signals) which are carry look-ahead signals for two 32-bit operands. At this time, a pair of lower 16 bits of two operands are input into the lower 16-bit prediction error detector 701 to then output a pair of a P signal and a G signal. Similarly, a pair of upper 16 bits of two operands are input into the upper 16-bit prediction error detector 702 to then output a pair of the P signal and the G signal. The P signal and the G signal being output are the carry look-ahead signals generated from the least significant bits <0> in respective blocks.

Figure 22:
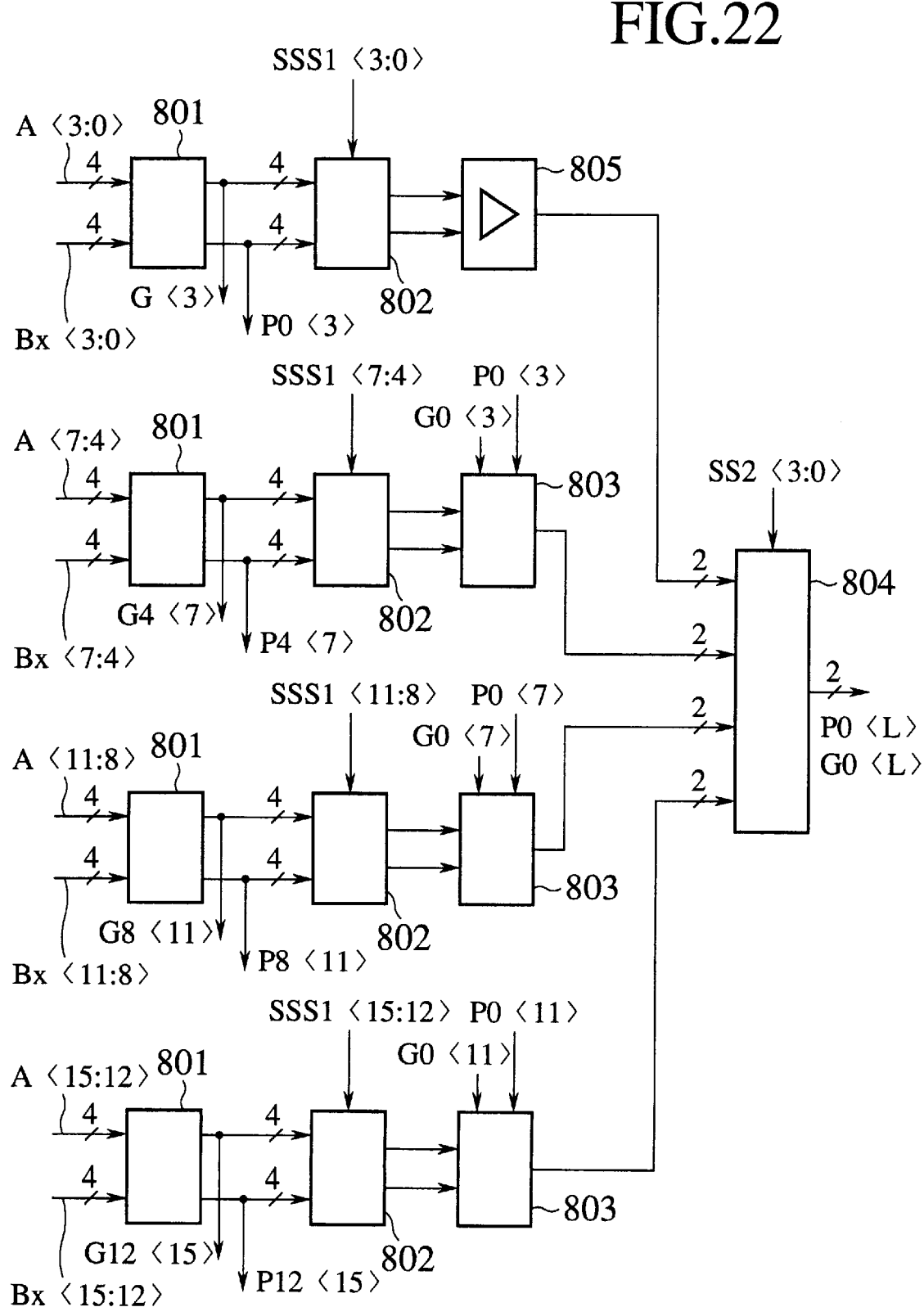
FIG. 22 is a block diagram showing a configuration of a lower 16-bit prediction error detector 701 shown in FIG. 21.
Figure 23:
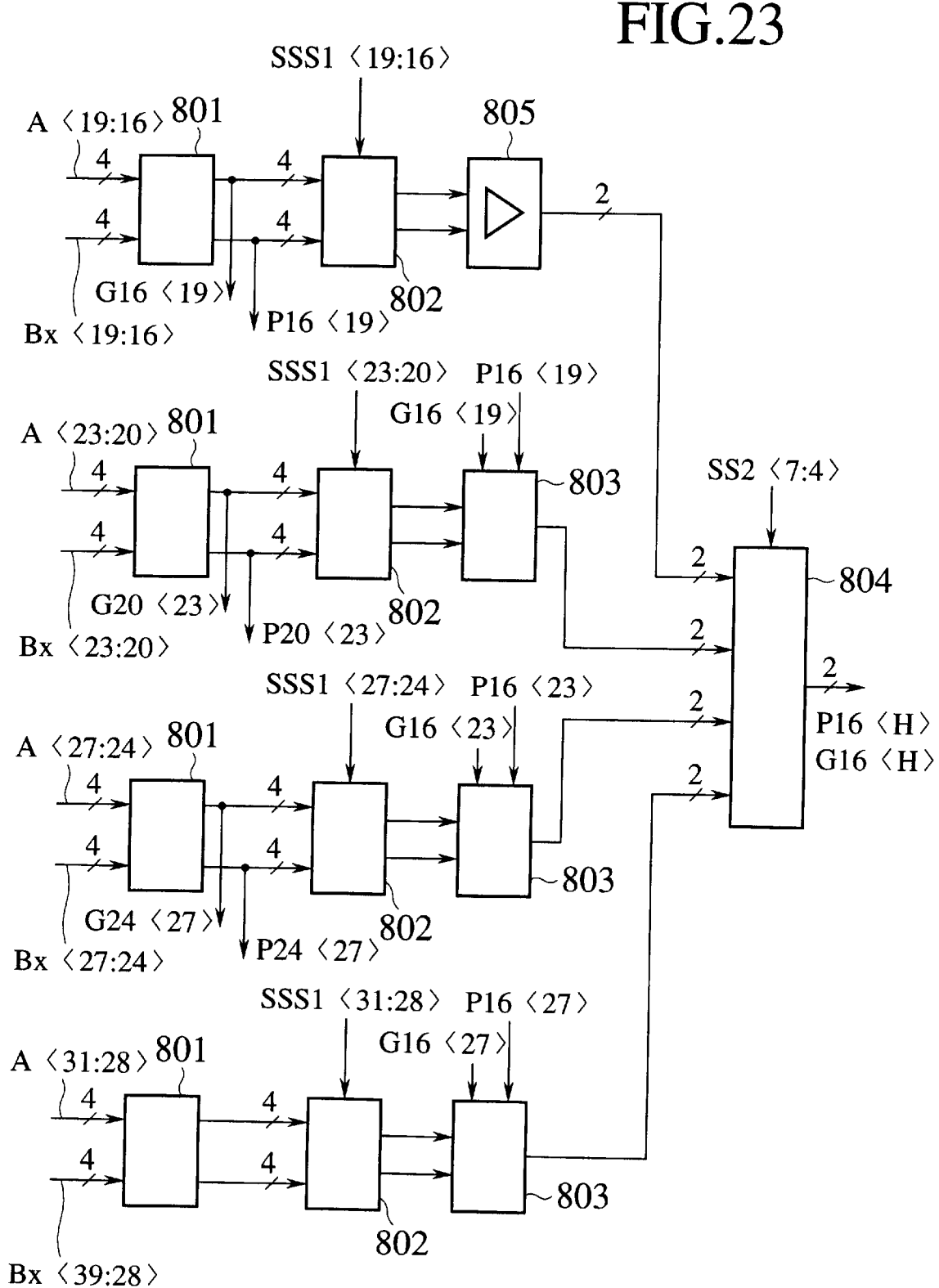
FIG. 23 is a block diagram showing a configuration of an upper 16-bit prediction error detector 702 shown in FIG. 21.
Figure 24:
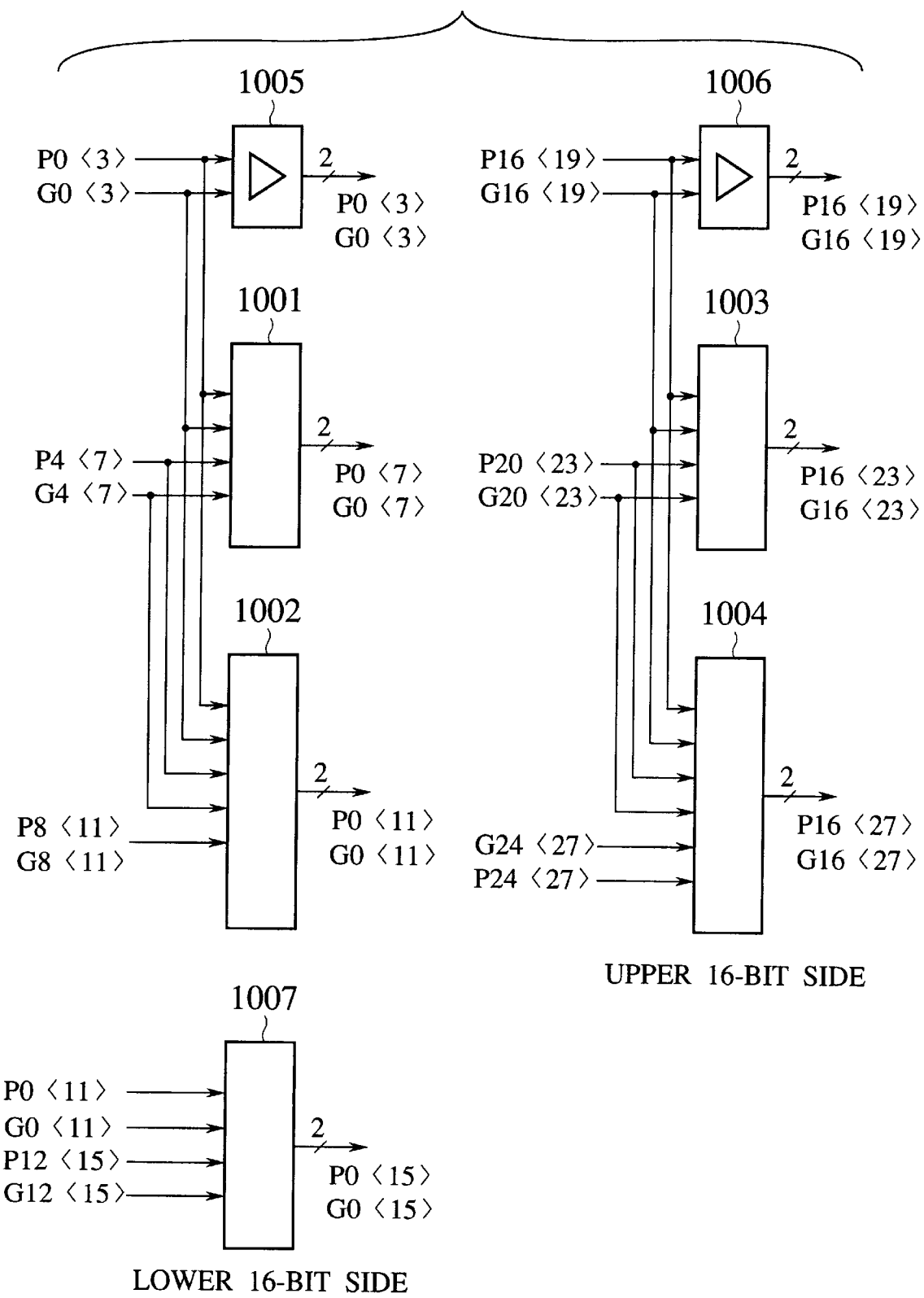
FIG. 24 is a block diagram showing a configuration of a carry look-ahead signal updating circuit in the floating-point arithmetic unit according to the third embodiment of the present invention.
Figure 25:
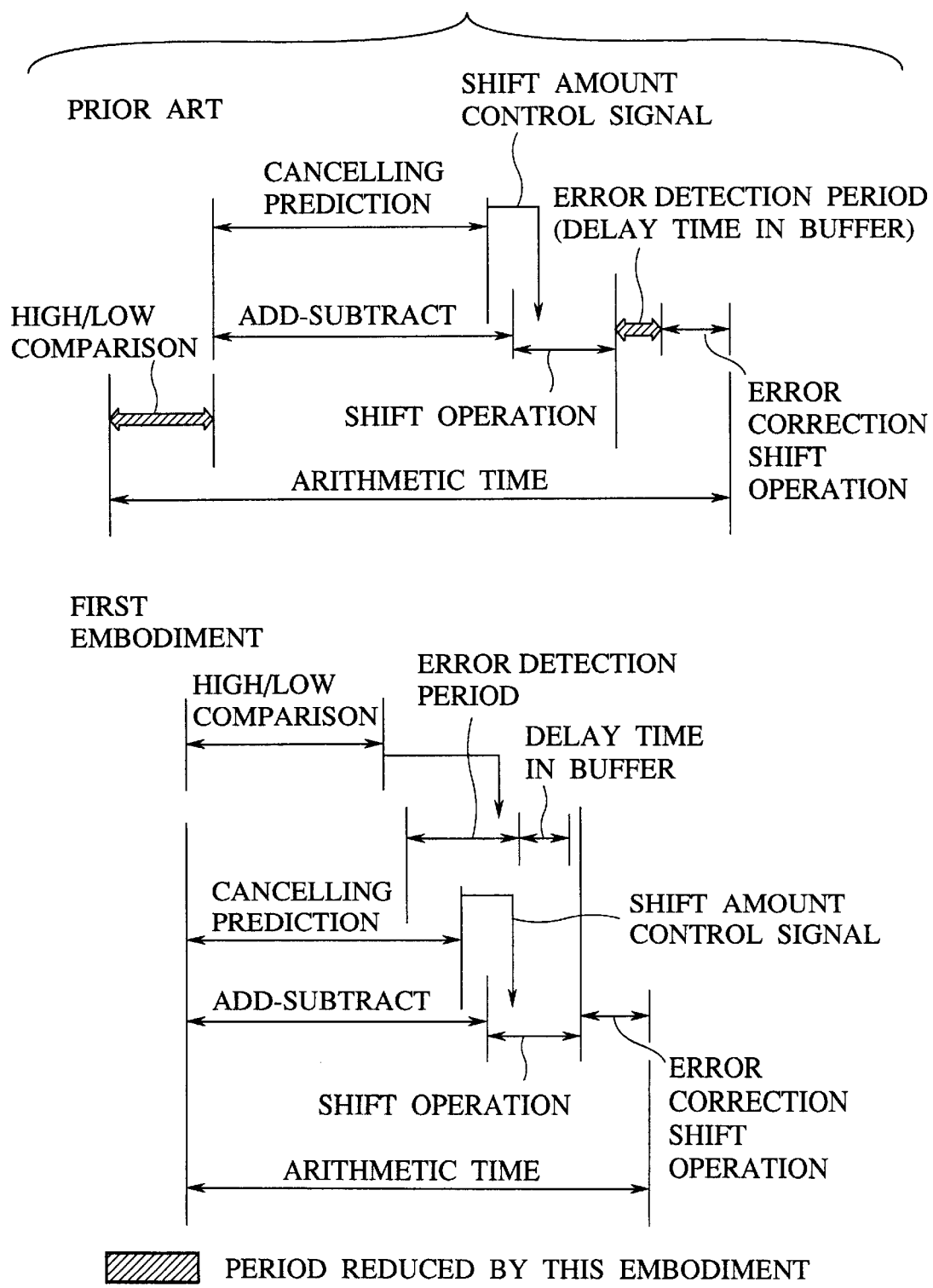
FIG. 25 is a view illustrating an advantage effect that a normalization time required for the floating-point arithmetic unit according to the third embodiment of the present invention can be shortened.

The lower 16-bit prediction error detector 701 shown in FIG. 22 comprises 4-bit carry look-ahead circuits 801, selectors 802, 804, and carry look-ahead signal updating circuits 803. Meanwhile, FIG. 23 shows a configuration of the upper 16-bit prediction error detector 702 shown in FIG. 21, which comprises the 4-bit carry look-ahead circuits 801, the selectors 802, 804, and the carry look-ahead signal updating circuits 803. The 16-bit prediction error detectors 701, 702 need further an interblock carry look-ahead circuit provided between them in addition to the above. A configuration of the interblock carry look-ahead circuit is shown in FIG. 24. As shown in FIG. 24, the carry look-ahead signal updating circuit can generate interblock carry look-ahead signals (P0<i>, G0<i> (i=3, 7, 11, 15), P16<j>, G16<j> (j=19, 23, 27)), and then output them to the carry look-ahead signal updating circuit 803.

Next, operations for detecting prediction error executed by the above circuit shown in FIGS. 22, 23, 24, 21 will be explained in sequence with reference to FIGS. 22, 23, 24, 21 hereunder. FIG. 22 shows the lower 16-bit prediction error detector 701. This detector 701 can output a pair of carry look-ahead signals finally based on lower 16-bits of two operands. The 16-bit signals are classified into four groups herein, while using four pairs which correspond to sequential four bits respectively as one group. At first, four pairs of the carry look-ahead signals are generated from the smallest bits in these groups. These four pairs of the carry look-ahead signals can correspond to respective bits of the output signal of the 4-bit priority encoders 801, and then pairs of the carry look-ahead signals corresponding to "1" bits out of four bits can be selected by the selectors 802. The carry look-ahead signal updating circuits 803 can then update pairs of carry look-ahead signal, which are selected from four blocks respectively, into signals which are integrated from the least significant bits (of the 16-bit blocks). The selectors 804 can then select pairs of the carry look-ahead signals corresponding to effective blocks from the above updated carry look-ahead signals. With the above, the lower 16-bit prediction error detector 701 can update and select in parallel the carry look-ahead signals.

Next, an operation of the lower 16-bit prediction error detector 701 will be explained in detailed with reference to FIG. 22 hereunder. Although 16 bits are classified into four 4-bit groups in this circuit, one unit of these 4-bit groups is the 4-bit carry look-ahead circuit 801.

The 4-bit carry look-ahead circuit 801 can generate p signals (carry propagation signals) and g signals (carry generation signals) for respective bits as follows. In addition, the 4-bit carry look-ahead circuit 801 can generate P signals (carry propagation signals) and G signals (carry generation signals) which are the carry signals generated from the smallest bits in the four groups. (For simplicity of following expression, "·" denotes logical product (and) and "+" denotes logical sum (or).)

(Eq.1)

$$p<J> = A<J> \text{ xor } Bx<J>$$
$$g<J> = A<J> \text{ and } Bx<J> = A<J>.Bx<J>$$
$$PJ<J> = p<J>$$
$$GJ<J> = g<J>$$
$$PJ<J+1> = p<J+1>.p<J>$$
$$GJ<J+1> = g<J+1>+(p<J+1>.g<J>)$$
$$PJ<J+2> = p<J+2>.p<J+1>.p<J>$$
$$GJ<J+2> = g<J+2>+(p<J+2>.g<J+1>)+ (p<J+2>.p<J+1>.g<J>)$$
$$PJ<J+3> = P<J+3>.p<J+2>.p<J+1>.p<J>$$
$$GJ<J+3> = g<J+3>+(p<J+3>.g<J+2>)+ (p<J+3>.p<J+2>.g<J+1>)+ (p<J+3>.p<J+2>.p<J+1>.g<J>)$$

Based on the selection control signals corresponding to active bits (only the bits corresponding to the active bits can become "1" out of the candidates 1:SSS1<J+3:J> 31 of the first shift amount selection control signal S1), the selectors 802 can select a pair of the P signal and the G signal (PJ<L>, GJ<L>) corresponding to the above active bits respectively (where J≦L≦J+3).

In the preceding carry look-ahead signal updating circuits 803, based on these PJ<L>, GJ<L> and pairs of the interblock carry look-ahead signals (P0<J-1>, G0<J-1>, J=4, 8, 12) generated from the lower block, the carry look-ahead signals can be updated in the following (where P0<3>, G0<3> are set as they are).

P0<L>=PJ<L>·P0<J-1>

G0<L>=GJ<L>+(PJ<L>·G0<J-1>)

In other words, the carry look-ahead hierarchy can be updated from four bit blocks to the carry look-ahead signals P0<i>, G0<i> ranging from the least significant bit (the 0-th bit) to the concerned bit <i> by integrating the 4-bit carry look-ahead signals of the lower block. In this case, the carry look-ahead signals ranging from the 0-th bit to the succeeding 4-bit blocks can be generated by the interblock carry look-ahead signal updating circuits 1001 to 1005 shown in FIG. 24.

According to the selection control signals corresponding to active blocks (only the bits corresponding to the active blocks out of the candidates 1:SS2<3:0>34 of the second shift amount selection control signals become "1") out of four pairs of these updated carry look-ahead signals (P signals, G signals), the selectors 804 can select a pair of carry look-ahead signals.

In the meanwhile, FIG. 23 shows the upper 16-bit prediction error detector 702 shown in FIG. 21. Like the lower 16-bit prediction error detector 701 shown in FIG. 22, this prediction error detector 702 can generate four pairs of 4-bit hierarchical carry look-ahead signals (P signals, G signals), and the selectors 802 can then select pairs of carry lookahead signals (PI<H>, GI<H>) from these signals using the signal SSS1<I+3:I> corresponding to the active bits as the selection control signals (where I≦H≦I+3).

Then, in the carry look-ahead signal updating circuits 803, the carry look-ahead signals can be updated as shown in the following equations, based on these PI<H>, GI<H> and pairs of the interblock carry look-ahead signals (P16<I-1>, G16<I-1>) generated from the lower blocks (I=20, 24, 28)(where P0<3>, G0<3> are set as they are).

P16<H>=PI<H>·P16<I-1>

G16<H>=GI<H>+(PI<H>·G16<I-1>)

Moreover, the selectors 804 can select a pair of the signals P, G of four pairs of signals P, G in accordance with the selection control signals corresponding to the active blocks (only the bits corresponding to the active blocks out of the candidates 1:SS2<3:0>34 of the second shift amount selection control signal S2 can become "1".)

By the way, pairs of interblock carry look-ahead signals (P0<i>, G0<i> (i=3, 7, 11, 15), P16<j>, G16<j> (j=19, 23, 27)) which are pairs of signals P, G in one more system to be output to the carry look-ahead signal updating circuit 803 can be generated by the carry look-ahead signal updating circuits 1001 to 1004, and 1007 shown in FIG. 24 as follows. The carry look-ahead signal updating circuit 1001 can generate

P0<7>=P4<7>·P0<3>

G0<7>=G4<7>+(P4<7>·G0<3>).

The carry look-ahead signal updating circuit 1002 can generate

P0<11>=P8<11>·P4<7>·P0<3>

G0<11>=G8<11>+(P8<11>·G4<7>)+(P8<11>·P4<7>·G0<3>).

The carry look-ahead signal updating circuit 1003 can generate

P16<23>=P20<23>·P1<19>

G16<23>=G20<23>+(P20<23>·G16<19>).

The carry look-ahead signal updating circuit 1004 can generate

P16<27>=P24<27>·P20<23>·P16<19>

G16<27>=G24<27>+(P24<27>·G20<23>)+(P24<27>·P20<23>·G16<19>).

The carry look-ahead signal updating circuit 1007 can generate

P0<15>=P12<15>·P0<11>

G0<15>=G12<15>+(P12<15>·G0<11>).

Where PK<J> and GK<J> can be defined by following expressions for K<M<J.

PK<J>=(PM+1<J>)·(PK<M>)

GK<J>=(GM+1<J>)+((PM+1<J>)·(GK<M>))

The buffers 1005, 1006 can strengthen driving forces of P0<3>, G0<3>, P16<19>, G16<19>. In FIG. 21, the lower 16-bit prediction error detector 701 and the upper 16-bit prediction error detector 702 can generate the cancelling prediction error detecting signal: SHFTR 26 finally in compliance with the pair of output signals P, G. The carry generation logic circuit portions 703, 704 can generate final carry signals from the carry look-ahead signals (P0<15>, G0<15>) generated from the lower block and the pairs of signals P,G (P0<L>, G0<L>, P16<H>, G16<H>) output from the upper 16-bit prediction error detector 702 respectively.

In other words, the carry generation logic circuit portion 703 can generate.

CZ(L)=G0<L>+(P0<L>·Cin)=G0<L>+P0<L> (Cin=1)

CG(L)=G0<L>+(P0<L>·Cin)=G0<L> (Cin=0)

based on the signal Cin and the signals G0<L>, P0<L> (0≦L≦15). The carry generation logic circuit portion 704 can also generate CZ(H) = G16<H>+(P16<H>.G0<15>)+(P16<H>.P0<15>.Cin) = G16<H>+(P16<H>.G0<15>)+(P16<H>.PO<15>) (Cin=1)

CG(H) = G16<H>+(P16<H>.G0<15>)+(P16<H>.P0<15>.Cin) = G16<H>+(P16<H>.G0<15>) (Cin=0)

based on the signal Cin and the signals G16<H>, P16<H>, G0<15>, P0<15> (16≦H≦31). That is to say, the signal Cin is set as Cin=0 when addition is executed or the subtraction result becomes negative (SIGN=1), and the signal Cin is set as Cin=1 when the subtraction result becomes positive (SIGN=0), and therefore two carry candidates are prepared with respect to positive and negative of the subtraction result as above. According to the result (SIGN signal) of the high/low comparator, any carry candidate can be selected in the prediction error signal generator 705 in the succeeding stage.

Using the third shift amount selection control signal S3(25) as the selection control signal, the prediction error signal generator 705 can select one of two pairs of the carry signals CZ(L), CG(L) and CZ(H), CG(H) (0≦L≦15, 16≦H≦31) which are output from the carry generation logic circuit portions 703, 704 respectively. This finally selected carry signal CZ<k> or CG<k> becomes the carry signal C<k> at the bit which coincides with the bit<k> predicted by the Leading zero/one Anticipator (cancelling prediction circuit).

In addition, the prediction error signal generator 705 can provide different prediction error signals according to the selected carry signal and the situation that the arithmetic result is addition or subtraction, or the resultant sign (actually the result of high/low comparison) in the case of subtraction. First, in the case of addition, SHFTR=CG<k> since the signal Cin is always set as Cin=0.

In the case of subtraction, if it is decided according to the comparison result of the high/low comparator that the result is positive (SIGN=0) and if the carry signal CZ<k> is "1", the arithmetic result includes one bit error. Hence, the control signal is output to the right shifter 5 such that the arithmetic result is shifted rightward by one bit to correct the error. In other words, the prediction error signal SHFTR serving as the above control signal can be given as SHFTR=CZ<k>.

On the contrary, if it is decided that the subtraction result is negative (SIGN=1) and if the carry signal CG<k> is "0", the arithmetic result also includes one bit error. Hence, the control signal is output to the right shifter 5 such that the arithmetic result is shifted rightward by one bit to correct the error. In other words, the prediction error signal SHFTR can be given as SHFTR=not(CG<k>)

since it becomes the inverted signal of the carry signal.

Next, operations of the circuits shown in FIGS. 22, 23, 21 will be explained in more detail hereunder. In the following example, it is assumed that the calculation is subtraction, and the result of high/low comparison is negative, i.e., the remainder is also negative. Also, it is assumed that the cancelling prediction signals at the bit<10> and the bit<19> has become "1".

First, the 4-bit block of bits<11:8> in the lower 16 bits will be considered. In this block, the cancelling prediction signal at the bit<10> becomes "1" based on the above assumptions. The carry look-ahead signals P8<10> and G8<10> can be generated by the 4-bit carry look-ahead circuit 801 shown in FIG. 22 as follows.

P8<10>=p<10>·p<9>·p<8>

G8<10>=g<10>+(p<10>·g<9>)+(p<10>·p<9>·g<8>)

At this time, these carry look-ahead signals P8<10> and G8<10> can be selected by the selector 802. The carry look-ahead signals are then updated by the carry look-ahead signal updating circuit 803 as follows.

P0<10>=P8<10>·P0<7>

G0<10>=G8<10>+(P8<10>·G0<7>)

The above pair of the carry look-ahead signals can be selected by the selector 804. (In other words, SSS1<11:8>= '0100', SSS2<3:0>='0100' and therefore the above pair can be selected.)

In contrast, in the 4-bit block of bits<19:16> in the upper 16 bits, the cancelling prediction signal at the bit<19> becomes "1". The carry look-ahead signals P16<19> and G16<19> can be generated by the 4-bit carry look-ahead circuit 801 shown in FIG. 22 as follows.

P16<19>=p<19>·p<18>·p<17>·p<16>

G16<19>=g<19>+(p<19>·g<18>)+ (p<19>·p<18>·g<17>)+(p<19>·p<18>·p<17>·g<16>)

Like the above, these carry look-ahead signals P16<19>, G16<19> can be selected by the selector 802. Since these signals have been selected as the carry signals from the least significant bit (bit<16>) of the upper 16-bit block, they are not updated as the carry signals. But the driving force can be increased by the buffer 805 as the case may be. The carry look-ahead signals P16<19>, G16<19> can be selected by the selector 804.

In this manner, a pair of cancelling look-ahead signals G0<10>, P0<10> corresponding to the bit <10> can be selected by the lower 16-bit prediction error detector 701, while a pair of cancelling look-ahead signals G16<19>, P16<19> corresponding to the bit <19> can be selected by the upper 16-bit prediction error detector 702.

Next, an operation for generating the carry finally will be explained with reference to FIG. 21 hereunder. At first, the carry at the bit<10> can be generated by the carry generation logic circuit 703. In FIG. 21, L=10.

CG<10>=G0<10> (in the case of Cin=0, addition, and subtraction result is negative)

CZ<10>=G0<10>+P0<10> (in the case of Cin=1, and subtraction result is positive)

The carry at the bit 19 can be generated by the carry generation logic circuit 704 shown in FIG. 21. In this case, if it is assumed that P0<19>=P16<19>·P0<15>, G0<19>= G16<19>+(P16<19>·G0<15>), the carry can be given by CG<19>=G0<19> (in the case of Cin=0, addition, and subtraction result is negative)

CZ<19>=G0<19>+P0<19> (in the case of Cin=1, and subtraction result is positive)

Since the bit <19> is higher bit, the priority level is higher. Therefore, the carry CG<19>, CZ<19> can be selected.

Since the subtraction result is assumed to be negative, the carry C<19> at the bit<19> can be given as

C<19>=CG<19>.

In addition, since the prediction error detecting signal can be given as the inverted signal of the carry signal when the result is negative, SHFTR=not(CG<19>).

The prediction error detector 103 mentioned above has many parts which are common in logic to the adder (arithmetic unit 101). Hence, if such common parts are used not to increase circuit layout and not to reduce operational performance, an area of the circuit layout can be optimized.

As described above, high/low comparing process can be executed in parallel with the adder in the first and second embodiments. That is, high/low comparison must be executed prior to commence of addition/subtraction in the conventional method shown FIG. 25A, but high/low comparison can be carried out in parallel with addition/subtraction process to thus improve a processing speed extremely in the present embodiment, as shown in FIG. 25B. Accordingly, it is evident from comparison between FIG. 25A and FIG. 25B that both the time required for the high/low comparison process and the time corresponding to the error detecting period can be reduced.

As have been described above, according to the invention set forth in claim 1, since, using the outputs of the priority encoders as the selection signal, final carry signals at respective bits of the adder are selected as the signal indicating that the prediction error is present or not, it can be earlier detected that the prediction error is present in the cancelling bit prediction circuit or not.

According to the invention set forth in claim 2, in the invention set forth in claim 1, since the intermediate results in the priority encoders which are defined earlier than the final outputs of the priority encoders are used as the selection signals, it can be earlier detected that the prediction error is present or not.

According to the invention set forth in claim 3, in the invention set forth in claim 1, since carry generation signals and carry propagation signals as intermediate results of the adder are selected by use of intermediate results in the priority encoders as selection signals, then carry signals which correspond to bits predicted by the cancelling bit prediction circuit are generated based on the carry generation signals and the carry propagation signals which are finally selected, and then the carry signals are output as signals indicating whether or not the prediction error is present, the presence of the cancelling prediction error can be earlier detected than the invention set forth in claim 2.

According to the invention set forth in claim 4, in the invention set forth in claim 1, in the floating-point arithmetic unit, since there is provided the cancelling prediction error detectors for detecting prediction error in the cancelling bit prediction circuit based on outputs of the priority encoders and final carry signals at respective bits of the adder, and the error correcting means can execute the error correction according to detection results of the cancelling prediction error detectors, the presence of the cancelling prediction error can be detected with the use of the outputs of the priority encoders supplied to the normalizing means as the control signals, so that a configuration of the unit can be simplified. In addition, the presence of cancelling prediction error can be detected early rather than the conventional method in which the presence of cancelling prediction error is examined based on the most significant bit of the output from the normalizing means.

According to the invention set forth in claim 5, in the invention set forth in claim 4, since the cancelling prediction error detectors are composed of selectors which can select carry signals at bits at which cancelling is caused from final carry signals at respective bits in the adder using outputs of the priority encoders as selection signals and the error correcting means is composed to execute the error correction according to the output of the selectors, the cancelling prediction error detectors can be simply constructed and precisely operated in the invention set forth in claim 4.

According to the invention set forth in claim 6, in the invention set forth in claim 5, since the cancelling prediction error detectors can receive intermediate results in the priority encoders as the selection signals, the same advantageous effects as those in the invention set forth in claim 2 can be achieved in the invention set forth in claim 5.

According to the invention set forth in claim 7, in the invention set forth in claim 4, since the cancelling prediction error detectors can select carry generation signals and carry propagation signals as intermediate results of the adder by use of intermediate results in the priority encoders as the selection signals, and then generate carry signals which correspond to bits predicted by the cancelling bit prediction circuit based on the carry generation signals and the carry propagation signals which are finally selected, and the error correcting means can execute the error correction according to the carry signals, the same advantageous effects as those in the invention set forth in claim 3 can be achieved in the invention set forth in claim 4.

According to the invention set forth in claim 8, using the signals output to the shifter as the selection control signals, it can be detected whether or not the cancelling prediction error is present. In addition, the presence of cancelling prediction error can be detected early rather than the conventional method in which the presence of cancelling prediction error is examined based on the most significant bit of the output from the left shifter.

According to the invention set forth in claim 9, in the invention set forth in claim 8, cancelling prediction of the result of addition/subtraction can be executed within one bit error even if the high/low relationship between two operands is not understood upon starting the subtraction.

According to the invention set forth in claim 10, in the invention set forth in claim 8, although the mantissa is changed into absolute value expression in floating-point type data, the cancelling prediction and one bit prediction error detection corresponding to this expression can be executed regardless of positive or negative of the arithmetic result.

According to the invention set forth in claim 11, the invention set forth in claim 10 can be similarly applied in the case of addition.

What is claimed is:

1. A logic circuit comprising:
   a cancelling bit prediction circuit for comparing bit by bit two operands which are input into an adder to be calculated, to decide previously bit by bit whether or not cancelling is caused by addition;
   priority encoders for outputting, in an encoded format, position of a most significant bit out of bits which have been decided previously by the cancelling bit prediction circuit such that cancelling is caused; and
   cancelling prediction error detectors for detecting prediction error in the cancelling bit prediction circuit based on outputs of the priority encoders;
   wherein the cancelling prediction error detectors are composed of selectors which receive final carry signals at respective bits in the adder and select one of the final carry signals as a signal indicating presence of the prediction error, by use of outputs of the priority encoders as selection signals.

2. A logic circuit as claimed in claim 1, wherein the cancelling prediction error detectors receive intermediate results in the priority encoders as the selection signals.

3. A logic circuit comprising:
   a cancelling bit prediction circuit for comparing bit by bit two operands which are input into an adder to be calculated, to decide previously bit by bit whether or not cancelling is caused by addition;
   priority encoders for outputting, in an encoded format, position of a most significant bit out of bits which have been decided previously by the cancelling bit prediction circuit such that cancelling is caused; and
   cancelling prediction error detectors for detecting prediction error in the cancelling bit prediction circuit based on outputs of the priority encoders;
   wherein the cancelling prediction error detectors select carry generation signals and carry propagation signals as intermediate results of the adder by use of intermediate results in the priority encoders as selection signals, then generate carry signals which correspond to bits predicted by the cancelling bit prediction circuit based on the carry generation signals and the carry propagation signals which are finally selected, and then output the carry signals as signals indicating whether or not the prediction error is present.

4. A floating-point arithmetic unit comprising:
   an adder for receiving two operands to execute an arithmetic operation;
   a cancelling bit prediction circuit for comparing two operands bit by bit to decide previously bit by bit whether or not cancelling is caused by addition;
   priority encoders for outputting, in an encoded format, position of a most significant bit out of bits which have been decided previously by the cancelling bit prediction circuit such that cancelling is caused;
   normalizing means for executing normalization process of an arithmetic output of the adder based on outputs of the priority encoders after floating-point arithmetic operation;
   error correcting means for executing error correction of result processed by the normalizing means; and
   cancelling prediction error detectors for detecting prediction error in the cancelling bit prediction circuit based on outputs of the priority encoders and final carry signals at respective bits of the adder;
   wherein the error correcting means executes the error correction according to detection results of the cancelling prediction error detectors.

5. A floating-point arithmetic unit as claimed in claim 4, wherein the cancelling prediction error detectors are composed of selectors which select carry signals at bits at which cancelling is caused from final carry signals at respective bits in the adder using outputs of the priority encoders as selection signals, and
   the error correcting means executes the error correction according to the output of the selectors.

6. A floating-point arithmetic unit as claimed in claim 5, wherein the cancelling prediction error detectors receive intermediate results in the priority encoders as the selection signals.

7. A floating-point arithmetic unit as claimed in claim 4, wherein the cancelling prediction error detectors selects carry generation signals and carry propagation signals as intermediate results of the adder by use of intermediate results in the priority encoders as the selection signals, and then generate carry signals which correspond to bits predicted by the cancelling bit prediction circuit based on the carry generation signals and the carry propagation signals which are finally selected, and
   the error correcting means executes the error correction according to the carry signals.

8. A floating-point arithmetic unit comprising:

a cancelling bit prediction circuit for comparing bit by bit two operands which are input into an adder to be calculated, to decide previously bit by bit whether or not cancelling is caused by addition;

priority encoders for receiving bit patterns which are output from the cancelling bit prediction circuit to indicate whether or not cancelling is present, and outputting position of a most significant bit out of bits which have been decided previously such that cancelling is caused, as selection signals in an encoded format; and cancelling prediction error detectors;

wherein the cancelling prediction error detectors selects carry generation signals and carry propagation signals finally based on intermediate results of the adder or respective bit carry look-ahead signals of two operands to be calculated, using intermediate results in the priority encoders as the selection signals, and then generate carry signals which correspond to bits predicted by the cancelling bit prediction circuit based on the carry generation signals and the carry propagation signals.

9. A floating-point arithmetic unit as claimed in claim 8, wherein, under assumptions that operands are two n-bit numbers A<n-1:0>, B<n-1:0>, sign bits are SA, SB, or Bx=not B, SA="O", SB="1" in case of subtraction and Bx=B, SA="O",SB="1", i<n in case of addition, and g<i>=A<i> and Bx<i> p<i>=A<i> xor Bx<i> z<i>=not (A<i> or Bx<i>)

g<n>=SA and SB p<n+1>=p<n>=SA xor SB z<n>=not (SA or SB), the cancelling bit prediction circuit predicts the cancelling bit prediction signal EZ<i> as EZ<i>=((not p<i+2>) and ((g<i+1> and (not g<i>)) or (z<i+1> and (not z<i>)))) or ((p<i+2>) and ((g<i+1> and (not z<i>)) or (z<1+1> and (not g<i>)))).

10. A floating-point arithmetic unit as claimed in claim 8, further comprising a high/low comparator for comparing a high/low relationship between A and B, and wherein, under assumptions that g<i>=A<i> and Bx<i>, p<i>=A<i> xor Bx<i>, Bx=not B in case of subtraction, Bx=B in case addition, and the carry signal C<k> at a k-th bit is C<k>=g<k> or (p<k> and g<k-1>) or (p<k> and p<k-1> and g<k-2>) or (p<k> and p<k-1> and p<k-2> and g<k-3> or . . . or (p<k> and p<k-1> and p<k-2> and . . . and p<2> and p<1> and g<0>) or (p<k> and p<k-1> and p<k-2> and . . . and p<2> and p<1> and p<0> and Cin), the prediction error detecting signal at a k-th bit is set to C<k> in case Cin=1 when the high/low comparator has decided that a result of subtraction A−B is positive, and the prediction error detecting signal at the k-th bit is set to (not C<k>) in case Cin=1 when the high/low comparator has decided that the result of subtraction A−B is negative.

11. A floating-point arithmetic unit as claimed in claim 10, wherein, if the cancelling bit prediction circuit and the priority encoders identify that cancelling is caused at the k-th bit and if arithmetic operation is addition, the prediction error detecting signal is set to C<k> in case of Cin=0.

* * * * *